(12) United States Patent
Cui et al.

(10) Patent No.: US 10,243,708 B2
(45) Date of Patent: Mar. 26, 2019

(54) METHOD FOR PERFORMING DYNAMIC DOWNLINK CONFIGURATION IN WIRELESS COMMUNICATION SYSTEM, BASE STATION AND TERMINAL

(71) Applicants: Qimei Cui, Beijing (CN); Ting Fu, Beijing (CN); Mingliang Tao, Beijing (CN); Zhongbin Qin, Beijing (CN)

(72) Inventors: Qimei Cui, Beijing (CN); Ting Fu, Beijing (CN); Mingliang Tao, Beijing (CN); Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 125 days.

(21) Appl. No.: 14/771,419

(22) PCT Filed: Dec. 26, 2013

(86) PCT No.: PCT/CN2013/090517
§ 371 (c)(1),
(2) Date: Aug. 28, 2015

(87) PCT Pub. No.: WO2014/134957
PCT Pub. Date: Sep. 12, 2014

(65) Prior Publication Data
US 2016/0013902 A1 Jan. 14, 2016

(30) Foreign Application Priority Data
Mar. 6, 2013 (CN) .......................... 2013 1 0071692

(51) Int. Cl.
*H04L 5/00* (2006.01)
*H04L 1/18* (2006.01)
(Continued)

(52) U.S. Cl.
CPC .............. *H04L 5/0048* (2013.01); *H04L 1/18* (2013.01); *H04L 1/1812* (2013.01);
(Continued)

(58) Field of Classification Search
None
See application file for complete search history.

(56) References Cited

U.S. PATENT DOCUMENTS 9,521,669 B2 * 12/2016 Wang ................ H04W 72/0446
2013/0016686 A1 * 1/2013 Li .......................... H04L 1/1822
370/329

(Continued)

FOREIGN PATENT DOCUMENTS

CN 102457967 5/2012
CN 102752862 10/2012
(Continued)

OTHER PUBLICATIONS

International Search Report dated Feb. 27, 2014 in PCT/CN13/090517 Filed Dec. 26, 2013.
(Continued)

*Primary Examiner* — Lonnie V Sweet
(74) *Attorney, Agent, or Firm* — Xsensus, LLP

(57) ABSTRACT

A method performing dynamic downlink configuration in a wireless communications system, a base station, and a terminal. The method includes: setting a reconfiguration point to enable a first uplink and downlink subframe configuration to be adopted in a first configuration period before the reconfiguration point and enable a second uplink and downlink subframe configuration to be adopted in a second configuration period after the reconfiguration point; and adopting a reference uplink/downlink subframe configuration adapted for an uplink subframe intersection of respective uplink/downlink subframe configurations for a time sequence of a downlink HARQ process during the predetermined change of the dynamical downlink configuration. The resource utilization rate during the TDD uplink and downlink configuration and reconfiguration can be effectively ensured, the time sequence conflict can be solved, the
(Continued)

process can be coordinated, the user throughput can be ensured, and the transmission delay can be reduced as far as possible.

19 Claims, 16 Drawing Sheets

(51) Int. Cl.
    *H04L 12/841*     (2013.01)
    *H04W 72/04*     (2009.01)
    *H04W 88/08*     (2009.01)

(52) U.S. Cl.
    CPC ........... *H04L 47/283* (2013.01); *H04W 72/04* (2013.01); *H04W 72/042* (2013.01); *H04W 88/08* (2013.01)

(56) References Cited

U.S. PATENT DOCUMENTS

| | | | |
|---|---|---|---|
| 2013/0242889 A1* | 9/2013 | Khoryaev | H04W 72/0413 370/329 |
| 2013/0301490 A1* | 11/2013 | He | H04W 4/90 370/280 |
| 2014/0362832 A1* | 12/2014 | Rudolf | H04L 1/1822 370/336 |
| 2016/0021655 A1* | 1/2016 | Seo | H04L 1/1829 370/280 |

FOREIGN PATENT DOCUMENTS

| | | |
|---|---|---|
| WO | WO 2010/049587 A1 | 5/2010 |
| WO | WO 2010/129295 A1 | 11/2010 |
| WO | 2011 122478 | 10/2011 |

OTHER PUBLICATIONS

Discussion on HARQ and UL-grant timing with dynamic TDD UL-DL configuration, 3GPP TSG RAN WG1 Meeting #68bis, R1-121260, Mar. 26-30, 2012, 6 pages.
PDSCH HARQ timing, 3GPP TSG RAN WG1 #68bis, R1-121612, Mar. 26-30, 2012, 4 pages.
PDSCH HARQ timing for more than 2 cell cases, 3GPP TSG RAN WG1 #70, R1-123451, Aug. 13-17, 2012, 4 pages.

* cited by examiner

A/N feedback for PDSCH in accordance with the configuration #3

A/N feedback for PDSCH in accordance with the configuration #5

Figure 13

METHOD FOR PERFORMING DYNAMIC DOWNLINK CONFIGURATION IN WIRELESS COMMUNICATION SYSTEM, BASE STATION AND TERMINAL

FIELD

The disclosure relates to the technical field of wireless communication, and in particular to a method for performing a dynamic downlink configuration in a wireless communication system, a base station and a communication terminal.

BACKGROUND

This section provides background information relating to the present disclosure, which is not necessarily prior art.

In a time division duplex (TDD) wireless communication system supported by the long term evolution (LTE) technology, 7 types of different non-symmetric uplink/downlink configurations can be provided. These uplink/downlink configurations may be provided downlink subframes of 40% to 90%, and have flexible service adaptability.

For the 7 types of uplink/downlink configurations, it is stipulated in the current standard the uplink/downlink hybrid automatic repeat request (HARQ) time sequence and uplink/downlink HARQ parallel process numbers for different configurations. In which, the uplink HARQ time sequence includes a schedule UL grant time sequence for the physical uplink shared channel (PUSCH) and a feedback PHICH (physical hybrid ARQ indicator channel) time sequence for the PUSCH, and the downlink HARQ time sequence includes feedback ACK/NACK time sequence for the physical downlink shared channel (PDSCH).

In the current TDD wireless communication system, in order to reduce interference between cells and decrease the management complexity, the same uplink/downlink configuration will be set statically for cells in the whole network. Under a homogeneous network, in case of covering using a macro base station, since the macro base station provides service for many users and the statistic law for the covered regions is smooth and consistent, the method of statically setting the same uplink/downlink configuration for the cells in the whole network is appropriate. However, under a heterogeneous network, a lot of low power access points are introduced, for example micro base stations, pico base stations, home base stations and remote radio units. Since the low power access points provide service for a few users, generally cover via hot spots, and uplink/downlink service amount of its covered regions changes dynamically and significantly, uplink/downlink service amounts between different low power access points are different significantly. In this case, adopting the above mentioned solution of the static and same configuration in the whole network will influence the improvement of the throughput of the heterogeneous network.

A dynamic TDD uplink/downlink configuration having flexible service self-adaptability may be conceived. As compared with the conventional static or semi-static TDD uplink/downlink configuration, in case of the dynamic TDD uplink/downlink configuration, appropriate uplink/downlink configuration is selected dynamically based on the service amount change condition by various cells, thereby the adaptability and the flexibility is stronger.

In the other aspect, since the uplink/downlink configuration used by each cell dynamically changes as the service amount of the cell changes, the same cell may use different uplink/downlink configurations in different time. The HARQ time sequence solution stipulated in the current standard may not be applicable for the case that the previous and next uplink/downlink configurations change.

SUMMARY

This section provides a general summary of the present disclosure, and is not a comprehensive disclosure of its full scope or all of its features.

An object of the present disclosure is to provide a method for performing a dynamic downlink configuration in a wireless communication system, a base station and a communication terminal, which can efficiently ensure the resource utilization during TDD uplink/downlink configuration and reconfiguration, solve a time sequence conflict, coordinate the process, ensure the user throughput, and reduce a transmission time delay as much as possible.

According to an aspect of the present disclosure, there is provided a method for performing a dynamic downlink configuration in a wireless communication system including: setting a reconfiguration point, so that a first uplink/downlink subframe configuration is adopted in a first configuration period before the reconfiguration point and a second uplink/downlink subframe configuration is adopted in a second configuration period after the reconfiguration point; and adopting, during the predetermined change of the dynamical downlink configuration, for a time sequence of a downlink HARQ process, a reference uplink/downlink subframe configuration adapted for an uplink subframe intersection of respective uplink/downlink subframe configurations.

According to another aspect of the present disclosure, there is provided a method for performing a dynamic downlink configuration in a wireless communication system including: setting a reconfiguration point, so that a first uplink/downlink subframe configuration is adopted in a first configuration period before the reconfiguration point and a second uplink/downlink subframe configuration is adopted in a second configuration period after the reconfiguration point; and stopping, at a boundary frame which is the last frame sent before the reconfiguration point, retransmission of a downlink HARQ process or first time data transmission.

According to another aspect of the present disclosure, there is provided a device on aside of a base station including: a setting unit, configured to set a reconfiguration point, such that a first uplink/downlink subframe configuration is adopted in a first configuration period before the reconfiguration point and a second uplink/downlink subframe configuration is adopted in a second configuration period after the reconfiguration point; and a dynamical downlink configuration unit, configured to perform a dynamical downlink configuration, such that a reference uplink/downlink subframe configuration adapted for an uplink subframe intersection of respective uplink/downlink subframe configurations is adopted for a time sequence of a downlink HARQ process during the predetermined change of the dynamical downlink configuration.

According to another aspect of the present disclosure, there is provided a device on a side of a base station including: a setting unit, configured to set a reconfiguration point, such that a first uplink/downlink subframe configuration is adopted in a first configuration period before the reconfiguration point and a second uplink/downlink subframe configuration is adopted in a second configuration period after the reconfiguration point; and a dynamical downlink configuration unit, configured to perform a dynamical downlink configuration, such that at a boundary frame which is the last frame sent before the reconfiguration point, retransmission or initial data transmission of a downlink HARQ process is stopped.

According to another aspect of the present disclosure, there is provided a base station including: the device on the side of the base station according the present disclosure; and a transmitting unit, configured to send a signaling to a communication terminal to inform the communication terminal of information on a dynamical downlink configuration.

According to another aspect of the present disclosure, there is provided a communication terminal including: a receiving unit, configured to receive a signaling sent from a base station to obtain information on a dynamical downlink configuration, and receive data transmitted or retransmitted by the base station based on the dynamical downlink configuration; a processing unit, configured to decode the data based on the dynamical downlink configuration; and a transmitting unit, configured to send feedback information to the base station based on the dynamical downlink configuration and a decoding result of the processing unit, wherein a reference uplink/downlink subframe configuration adapted for an uplink subframe intersection of respective uplink/downlink subframe configurations is adopted for a time sequence of a downlink HARQ process during the predetermined change of the dynamical downlink configuration.

With the method for performing a dynamic downlink configuration in a wireless communication system, the base station and the communication terminal, the time sequence for the HARQ processes is coordinated at a boundary frame, thereby achieving flexible service self-adaptability for the dynamic uplink/downlink configuration in a cell, ensuring the user throughput, and reducing the transmission time delay.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings:

FIG. 13 shows a schematic diagram of an example of an HARQ process number mapping conflict caused by a dynamic TDD;

Figure 1:
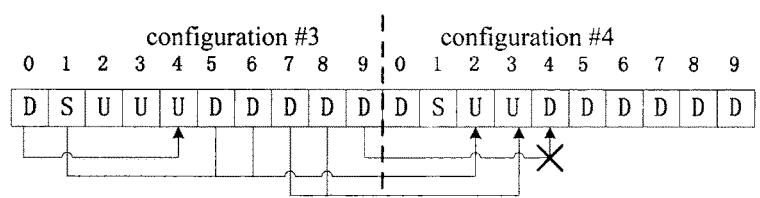
FIG. 1 shows a schematic diagram of an example of an HARQ time sequence conflict caused by a dynamic TDD.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The following table 1 shows a time sequence solution for a downlink HARQ in the current standard. In table 1, a number k (for example 4, 6 in configuration #0) indicates that: if a PDSCH is transmitted in a subframe of which a subframe number is n, ACK/NACK information is fed back in a subframe of which a subframe number is (n+k); furthermore, if n+k>9, it is indicated that the ACK/NACK information should be fed back in a subframe of which a subframe number is (n+k)% 10, where "%" indicates a mod operation.

TABLE 1 feedback ACK/NACK time sequence for a downlink PDSCH

| | Subframe number | | | | | | | | | |
|---|---|---|---|---|---|---|---|---|---|---|
| | 0 | 1 | 2 | 3 | 4 | 5 | 6 | 7 | 8 | 9 |
| configuration#0 | 4 | 6 | | | 4 | 6 | | | | |
| configuration#1 | 7 | 6 | | | 4 | 7 | 6 | | | 4 |
| configuration#2 | 7 | 6 | 4 | 8 | 7 | 6 | | 4 | 8 | |
| configuration#3 | 4 | 11 | | | 7 | 6 | 6 | 5 | 5 | |
| configuration#4 | 12 | 11 | | 8 | 7 | 7 | 6 | 5 | 4 | |
| configuration#5 | 12 | 11 | | 9 | 8 | 7 | 6 | 5 | 4 | 13 |
| configuration#6 | 7 | 7 | | | 7 | 7 | | | | 5 |

In the case that configuration changes and if the time sequence does not change, uplink/downlink in the new configuration period of a subframe for feedback and retransmission defined in a previous configuration has changed. FIG. 1 shows an example of an HARQ time sequence conflict caused by a dynamic TDD.

As shown in FIG. 1, configuration #3 is adopted in a configuration period on the left of a dotted line while configuration #4 is adopted in a configuration period on the right of the dotted line. In which, a letter "D" indicates a downlink subframe, a letter "S" indicates a special subframe, and a letter "U" indicates an uplink subframe. It is assumed that in FIG. 1 ACK/NACK feedback for PDSCH in accordance with the configuration #3 is adopted. Referring to the table 1 above, if the PDSCH is transmitted in a subframe of which a subframe number is 9 in the configuration #3, the ACK/NACK information is fed back in a subframe of which a subframe number is (9+5)% 10=4 in a next frame. However, since the configuration #4 is adopted in the next frame and a subframe of which a subframe number is 4 in the next frame adopting the configuration #4 is a downlink subframe, hence the ACK/NACK information can not be fed back. In this case, a conflict occurs, and thereby HARQ performance for a user is influenced negatively.

In order to solve a potential time sequence conflict problem of a dynamic TDD system, the inventor of the disclosure sets forth an HARQ time sequence processing solution to coordinate transmission time sequences of subframes.

Figure 2:
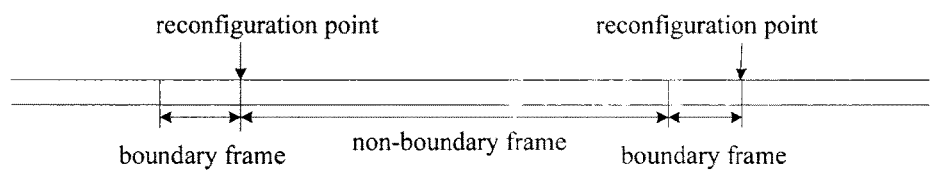
FIG. 2 shows a schematic diagram of a boundary frame and a non-boundary frame.

Firstly, a boundary frame and a non-boundary frame are defined in each configuration period. As shown in FIG. 2, which shows a boundary frame and a non-boundary frame. The boundary frame is defined as the last frame sent before a configuration point. The non-boundary frame is defined as a frame other than the boundary frame in the reconfiguration period. It is found by the inventor of the present disclosure that, an HARQ time sequence conflict occurs only in the boundary frame in the case that a dynamic TDD uplink/downlink configuration is reconfigured, and no HARQ time sequence conflict occurs in the non-boundary frame in the case that a dynamic TDD uplink/downlink configuration is reconfigured. Since the HARQ time sequence conflict may occur only in the last frame sent before the reconfiguration point, the last frame sent before the reconfiguration is defined as the boundary frame.

Figure 3:
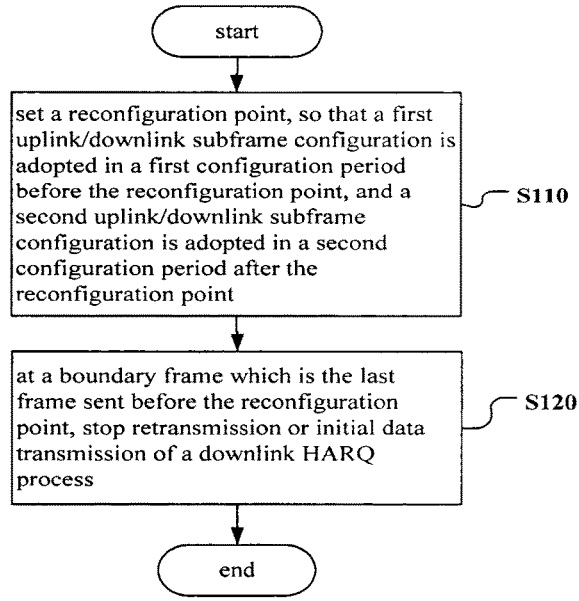
FIG. 3 shows a flowchart of a method for performing a dynamic downlink configuration in a wireless communication system according to an embodiment of the present disclosure.

FIG. 3 shows a method for performing a dynamic downlink configuration in a wireless communication system according to an embodiment of the present disclosure.

As shown in FIG. 3, in step S110, a reconfiguration point is set, such that a first uplink/downlink subframe configuration is adopted in a first configuration period before the reconfiguration point and a second uplink/downlink subframe configuration is adopted in a second configuration period after the reconfiguration point.

Furthermore, in step S120, at a boundary frame which is the last frame sent before the reconfiguration point, retransmission or initial data transmission of a downlink HARQ process is stopped.

Since in the boundary frame neither new data transmission is initiated nor a new round of data retransmission is initiated, the case of the HARQ time sequence conflict shown in FIG. 2 will not occur. The method shown in FIG. 3 may be applied to both a dynamic downlink configuration of a legacy UE and a dynamic downlink configuration of an R12 UE.

In addition, at frames other than the boundary frame (i.e., the non-boundary frame), for a time sequence of a downlink HARQ process, the first uplink/downlink subframe configuration is adopted in the first configuration period and the second uplink/downlink subframe configuration is adopted in the second configuration period.

Figure 4:
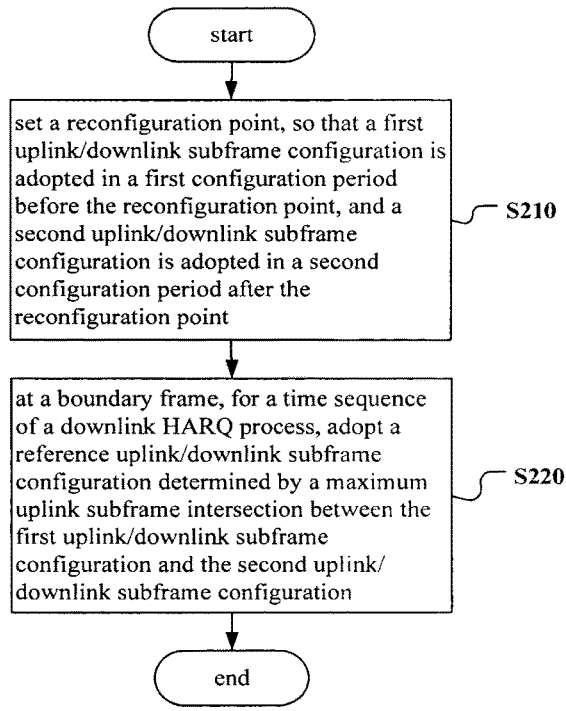
FIG. 4 shows a flowchart of a method for performing a dynamic downlink configuration in a wireless communication system according to another embodiment of the present disclosure.

FIG. 4 shows a method for performing a dynamic downlink configuration in a wireless communication system according to another embodiment of the present disclosure.

As shown in FIG. 4, in step S210, a reconfiguration point is set, such that a first uplink/downlink subframe configuration is adopted in a first configuration period before the reconfiguration point and a second uplink/downlink subframe configuration is adopted in a second configuration period after the reconfiguration point.

Furthermore, in step S220, during the predetermined change of for a time sequence of a downlink configuration, for a time sequence of a HARQ process, a reference uplink/downlink subframe configuration adapted for an uplink subframe intersection of respective uplink/downlink subframe configurations is adopted.

A boundary frame in which uplink/downlink subframe configuration is changed is include during the predetermined change of the dynamical downlink configuration.

The reference uplink/downlink subframe configuration is determined by a maximum uplink subframe intersection between the first uplink/downlink subframe configuration and the second uplink/downlink subframe configuration.

The reference uplink/downlink subframe configuration may include configuration #4, configuration #2 and configuration #5.

The method shown in FIG. 4 is only applied to a dynamic downlink configuration of an R12 UE. For the HARQ time sequence processing solution shown in FIG. 4, a reference configuration determined by a maximum uplink/downlink subframe intersection between two configurations needs to be selected as a time sequence for the boundary frame. Specifically, according to the uplink/downlink subframe configuration of configuration periods before and after the reconfiguration point, it may be classified into the following three cases:

First case: a set containing uplink subframes in a previous configuration period (i.e., a first configuration period) is a superset of a set containing uplink subframes in a new configuration (i.e., the previous period configuration contains all the uplink subframes in the new configuration and extra uplink subframes not contained in the new configuration; in other words, a set containing downlink subframes in the new configuration is a subset of a set containing downlink subframes in the previous period configuration).

Second case: a set containing uplink subframes in a previous period configuration is a subset of a set containing uplink subframes in a new configuration (i.e., the new configuration contains all the uplink subframes in the previous period configuration and extra uplink subframes not contained in the previous period configuration; in other words, a set containing downlink subframes in the new configuration is a superset of a set containing downlink subframes in the previous period configuration).

Third case: a set containing uplink subframes in a previous period configuration is neither a superset nor a subset of a set containing uplink subframes in a new configuration.

Based on the above classification, a classification table for all the reconfiguration cases may be drawn as shown in a table 2. In the table 2, a number "1" indicates the first case, a number "2" indicates the second case, and a number "3" indicates the third case.

TABLE 2 classification cases for different subframe reconfiguration

| | | \#0 | \#1 | \#2 | \#3 | \#4 | \#5 | \#6 |
|---|---|---|---|---|---|---|---|---|
| previous period configuration | \#0 | | 1 | 1 | 1 | 1 | 1 | 1 |
| | \#1 | 2 | | 1 | 3 | 1 | 1 | 2 |
| | \#2 | 2 | 2 | | 3 | 3 | 1 | 2 |
| | \#3 | 2 | 3 | 3 | | 1 | 1 | 2 |
| | \#4 | 2 | 2 | 3 | 2 | | 1 | 2 |
| | \#5 | 2 | 2 | 2 | 2 | 2 | | 2 |
| | \#6 | 2 | 1 | 1 | 1 | 1 | 1 | | new period configuration (column headers)

According to the HARQ time sequence processing solution shown in FIG. 4 above, corresponding downlink HARQ time sequence reference configurations are selected for the three cases respectively.

First case: at a boundary frame, the downlink HARQ time sequence is in accordance with an HARQ time sequence of a new configuration, i.e., the second uplink/downlink subframe configuration is adopted.

Second case: at a boundary frame, the downlink HARQ time sequence is in accordance with an HARQ time sequence of a previous period configuration, i.e., the first uplink/downlink subframe configuration is adopted.

Third case: at a boundary frame, the downlink HARQ time sequence is in accordance with a reference uplink/downlink subframe configuration determined by a maximum uplink subframe intersection between a previous configuration and a next configuration.

In fact, in the first case, the maximum uplink subframe intersection between the previous configuration and the next configuration is a set of uplink subframes in a new configuration (i.e., the second uplink/downlink subframe configuration), and a reference uplink/downlink subframe configuration determined by the maximum uplink subframe intersection is the second uplink/downlink subframe configuration. Furthermore, in the second case, in fact the maximum uplink subframe intersection between the previous configuration and the next configuration is a set of uplink subframes contained in the previous period configuration (i.e., the first uplink/downlink subframe configuration), and a reference uplink/downlink subframe configuration determined by the maximum uplink subframe intersection is the first uplink/downlink subframe configuration. In other words, according to the HARQ time sequence processing solution shown in FIG. 4, for the three cases above, at the boundary frame, the reference uplink/downlink subframe configuration determined by the maximum uplink subframe intersection between the previous configuration and the next configuration may be adopted for the downlink HARQ time sequence. The second uplink/downlink subframe configuration adopted in the first case and the first uplink/downlink subframe configuration adopted in the second case are only specific examples of the reference uplink/downlink subframe configuration determined by the maximum uplink/downlink subframe intersection between the previous configuration and the next configuration.

The following table 3 shows a final HARQ time sequence processing solution shown in FIG. 4. Numbers in table 3 indicate reference time sequence configurations adopted by the downlink HARQ time sequence.

TABLE 3 reference configuration solution for the downlink HARQ time sequence in a boundary frame of an R12 UE

| | | \#0 | \#1 | \#2 | \#3 | \#4 | \#5 | \#6 |
|---|---|---|---|---|---|---|---|---|
| previous period configuration | \#0 | | 1 | 2 | 3 | 4 | 5 | 6 |
| | \#1 | 1 | | 2 | 4 | 4 | 5 | 1 |
| | \#2 | 2 | 2 | | 5 | 5 | 5 | 2 |
| | \#3 | 3 | 4 | 5 | | 4 | 5 | 3 |
| | \#4 | 4 | 4 | 5 | 4 | | 5 | 4 |
| | \#5 | 5 | 5 | 5 | 5 | 5 | | 5 |
| | \#6 | 6 | 1 | 2 | 3 | 4 | 5 | | new period configuration (column headers)

In addition, in the method shown in FIG. 4, at frames other than the boundary frame (i.e., the non-boundary frame), for the time sequence of the downlink HARQ process, the first uplink/downlink subframe configuration is adopted in the first configuration period and the second uplink/downlink subframe configuration is adopted in the second configuration period.

Hereinafter downlink HARQ time sequence solutions for three downlink cases of the R12 UE in the HARQ time sequence processing shown in FIG. 4 are illustrated by specific examples.

Figures 5, 6, 7:
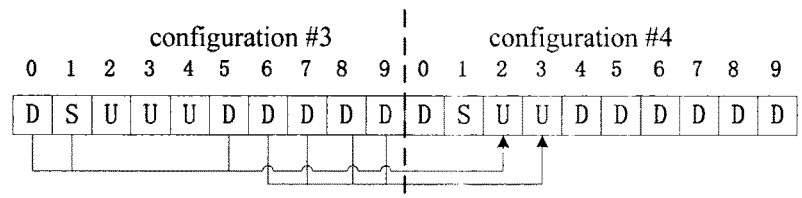
FIG. 5 shows a schematic diagram of an uplink/downlink subframe configuration of configuration #3 and configuration #4.
FIG. 6 shows a schematic diagram of a downlink HARQ time sequence adopting the configuration #4.
FIG. 7 shows a schematic diagram of an uplink/downlink subframe configuration of configuration #2 and configuration #0.

For the first case, it is assumed that the configuration #3 is adopted in the previous period and the configuration #4 is adopted in a new period. FIG. 5 shows uplink/downlink subframe configurations of the configuration #3 and the configuration #4. It can be seen from FIG. 5 that a set of uplink subframes contained in the configuration #3 is a superset of a set of uplink subframes contained in the configuration #4.

For convenience, the following table 4 shows downlink HARQ time sequences for the configuration #3 and the configuration #4 defined in the current standard independently.

TABLE 4 downlink HARQ time sequences defined in the current standard

| | Subframe number | | | | | | | | | |
|---|---|---|---|---|---|---|---|---|---|---|
| | 0 | 1 | 2 | 3 | 4 | 5 | 6 | 7 | 8 | 9 |
| configuration#3 | 4 | 11 | | | | 7 | 6 | 6 | 5 | 5 |
| configuration#4 | 12 | 11 | | | 8 | 7 | 7 | 6 | 5 | 4 |

In the boundary frame, if the downlink HARQ process still feeds back ACK/NACK based on the time sequence of the previous period configuration #3, the ACK/NACK feedback information can not be received since the subframe 4 becomes a downlink subframe in a next period, as shown in FIG. 1.

Therefore, according to the HARQ time sequence processing solution shown in FIG. 4, in the boundary frame the downlink HARQ process is performed based on the time sequence of the configuration #4, no ACK/NACK feedback conflict occurs, as shown in FIG. 6. FIG. 6 shows the downlink HARQ time sequence adopting the configuration #4.

For the second case, it is assumed that configuration #2 is adopted in the previous period and configuration #0 is adopted in a new period. FIG. 7 shows uplink/downlink subframe configurations of the configuration #2 and the configuration #0. It can be seen from FIG. 7 that a set of uplink subframes contained in the configuration #2 is a subset of a set of uplink subframes contained in the configuration #0.

For convenience, the following table 5 shows downlink HARQ time sequences of the configuration #2 and the configuration #0 defined in the current standard independently.

TABLE 5 downlink HARQ time sequences defined in the current standard

| | Subframe number | | | | | | | | | |
|---|---|---|---|---|---|---|---|---|---|---|
| | 0 | 1 | 2 | 3 | 4 | 5 | 6 | 7 | 8 | 9 |
| configuration#2 | 7 | 6 | | | 4 | 8 | 7 | 6 | | 4 | 8 |
| configuration#0 | 4 | 6 | | | | 4 | 6 | | | |

Figure 8:
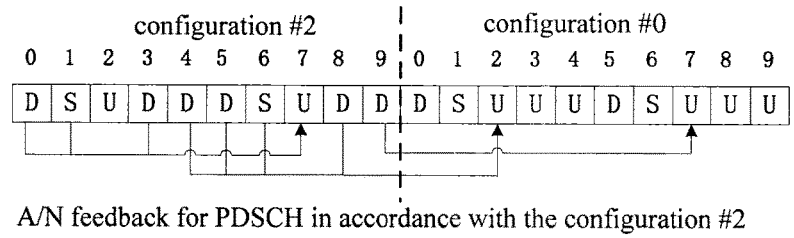
FIG. 8 shows a schematic diagram of a downlink HARQ time sequence adopting configuration #2.

Since uplink subframes of the configuration #2 are less than that of the configuration #0, in the case that the downlink HARQ process of the boundary frame still adopts the time sequence of the configuration #2, no ACK/NACK feedback conflict occurs in the PDSCH of the HARQ process, as shown in FIG. 8. FIG. 8 shows the downlink HARQ time sequence adopting the configuration #2.

Figure 9:
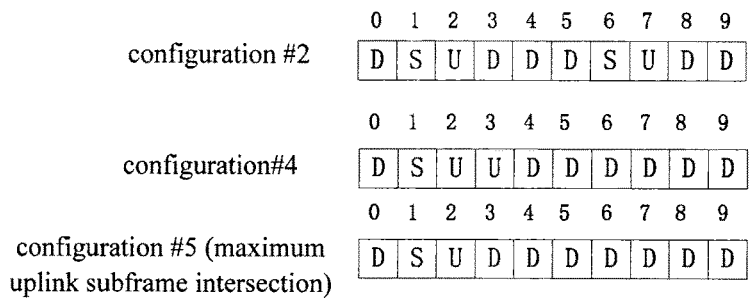
FIG. 9 shows a schematic diagram of an uplink/downlink subframe configuration of configuration #2, configuration #4 and configuration #5.

For the third case, it is assumed that the configuration #2 is adopted in the previous period and the configuration #4 is adopted in a new period. FIG. 9 shows uplink/downlink subframe configurations of the configuration #2, the configuration #4 and the configuration #5. It can be seen from FIG. 9 that a set of uplink subframes contained in the configuration #2 is neither a superset nor a subset of a set of uplink subframes contained in the configuration #4. Configuration #5 is a downlink HARQ reference configuration determined by a maximum uplink subframe intersection between the configuration #2 and the configuration #4.

For convenience, the following table 6 shows downlink HARQ time sequences of the configuration #2, the configuration #4 and the configuration #5 defined in the current standard independently.

TABLE 6 downlink HARQ time sequences defined in the current standard

| | Subframe number | | | | | | | | | |
|---|---|---|---|---|---|---|---|---|---|---|
| | 0 | 1 | 2 | 3 | 4 | 5 | 6 | 7 | 8 | 9 |
| configuration#2 | 7 | 6 | | | 4 | 8 | 7 | 6 | | 4 | 8 |
| configuration#4 | 12 | 11 | | | 8 | 7 | 7 | 6 | 5 | 4 |
| configuration#5 | 12 | 11 | | 9 | 8 | 7 | 6 | 5 | 4 | 13 |

Figure 10:
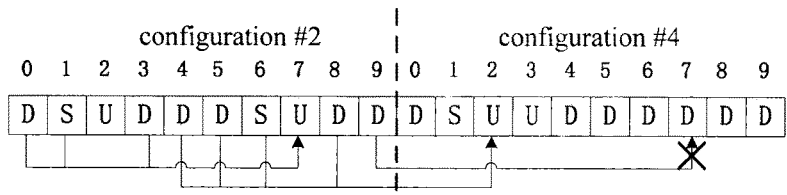
FIG. 10 shows a schematic diagram of a downlink HARQ time sequence adopting configuration #2.

In the boundary frame, if the downlink HARQ process still feeds back ACK/NACK based on a time sequence of the previous period configuration #2, ACK/NACK information can not be received since a subframe 7 becomes a downlink subframe in a next period, as shown in FIG. 10. FIG. 10 shows a downlink HARQ time sequence adopting the configuration #2.

In the boundary frame, if it is fed back adopting a time sequence of a new configuration #4, the downlink resource is wasted since a feedback time sequence for a subframe number 3 is not defined in the configuration #4 (since the subframe 3 is taken as an uplink subframe in this case).

Therefore, the downlink HARQ process of the boundary frame needs to be performed adopting the maximum uplink subframe intersection configuration (i.e., the configuration #5 above) between the previous period configuration and the next period configuration, which is due to the following aspects. In a first aspect, the most downlink subframe feedback time sequences are defined in the maximum uplink subframe intersection, hence no downlink resource is wasted; and in a second aspect, the least uplink subframes are contained in the maximum uplink subframe intersection, hence in feeding back ACK/NACK for the PDSCH, no ACK/NACK feedback resource conflict occurs due to that a subframe by which uplink feedback information is to be transmitted becomes a downlink subframe.

Figure 11:
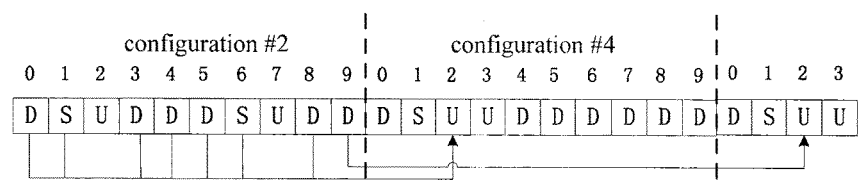
FIG. 11 shows a schematic diagram of a downlink HARQ time sequence adopting configuration #5.

A specific feedback process is shown in FIG. 11. FIG. 11 shows a downlink HARQ time sequence adopting the configuration #5.

After the transmission for the boundary frame ends, a new reconfiguration period starts. For all the terminals, uplink/downlink HARQ time sequences for the non-boundary frame (the first frame to the last but one frame) may be performed with stipulations in an R8 protocol version based on a new uplink/downlink configuration.

In addition, it is found by the inventor of the present disclosure that, different configurations can provide different maximum numbers of processes, therefore after the next uplink/downlink configuration changes relative to the previous uplink/downlink configuration, a problem may occur in mapping the process number of a process transmitted in the previous period which continues to be fed back or retransmitted in the next period.

In the current standard, the minimum HARQ roundtrip time (RTT) is defined as a minimum value of an interval between a time instant for retransmitting data and a time instant for transmitting the same data last time. For the TDD system, besides a processing time delay and a transmission time delay, the HARQ RTT also includes a certain waiting time delay. For example, after a UE receives downlink data sent from an eNodeB at a subframe n, there may be no uplink subframe at a position corresponding to the subframe n+4. Therefore, the UE needs to send ACK/NACK feedback on a corresponding uplink subframe after waiting for several subframes. Similarly, after the eNodeB receives the feedback from the UE at the subframe n, there may be no downlink subframe at a position corresponding to the subframe n+4. Therefore, similarly, the eNodeB needs to schedule a corresponding downlink HARQ process after waiting for a period of time. Hence, for the TDD system, RTTs for different uplink/downlink subframes are different under different configurations.

For a "stopping-waiting" HARQ, during one HARQ process, after one transmission is performed, next transmission (transmitting new data or retransmitting old data) will be performed after waiting for time RTT. During the time RTT, it is necessary to initiate other parallel HARQ processes to utilize time domain resource sufficiently. The number of processes after filling the RTT is the maximum number of HARQ processes. Hence, the number of HARQ processes is relative to the RTT. The greater the RTT is, the more parallel HARQ processes need to be supported to fill the RTT.

The following table 7 shows the maximum number of HARQ processes for different TDD uplink/downlink configurations defined in the standard.

TABLE 7 maximum number of HARQ processes for different uplink/downlink configurations

| configuration | downlink process number | uplink process number |
|---|---|---|
| 0 | 4 | 7 |
| 1 | 7 | 4 |
| 2 | 10 | 2 |
| 3 | 9 | 3 |
| 4 | 12 | 2 |
| 5 | 15 | 1 |
| 6 | 6 | 6 |

Figure 12:
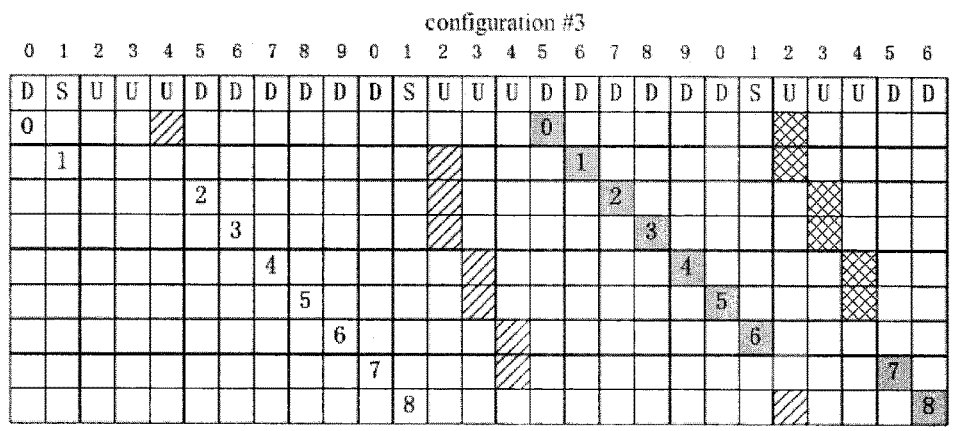
FIG. 12 shows a schematic diagram of an example of a downlink HARQ process of TDD LTE.

FIG. 12 shows an example of a downlink HARQ process for TDD LTE. The example of FIG. 12 shows one distribution solution for a system downlink HARQ process in case of adopting configuration #3. An asynchronous HARQ is adopted for downlink, and there is no definite time sequence relation between retransmission and the previous transmission, therefore the system may select any downlink subframe after the RTT as process retransmission, and inform the UE of a process number. The example shown in FIG. 12 is one downlink HARQ solution with the minimum time delay. In the downlink HARQ solution as shown in FIG. 12, downlink HARQ processes of which process numbers are 0 to 8 transmitted in a first transmission period are transmitted or retransmitted respectively in subframes of a first frame of which subframe numbers are 0, 1 and 9 and subframes of a second frame of which subframe numbers are 0 and 1; and downlink HARQ processes of which process numbers are 0 to 8 transmitted in a second transmission period are transmitted or retransmitted respectively in subframes of the second frame of which subframe numbers are 5 to 9 and subframes of a third frame of which subframe numbers are 0, 1, 5 and 6. It can be seen from FIG. 12 that, in case of adopting the configuration #3, a transmission period for the downlink HARQ is different from a frame period. In case of adopting other configurations, the transmission period for the downlink HARQ is also different from the frame period.

In the case that the uplink/downlink configuration changes, feedback or retransmission not completed before the reconfiguration point needs to continue to be transmitted on a process in a next configuration period. The maximum number of HARQ processes for different configurations are different, therefore if the maximum number of HARQ processes of a new period is less than that of an original period, a process of the original period which is greater than the maximum number of processes can not be transmitted correctly and an error occurs.

Figure 13:
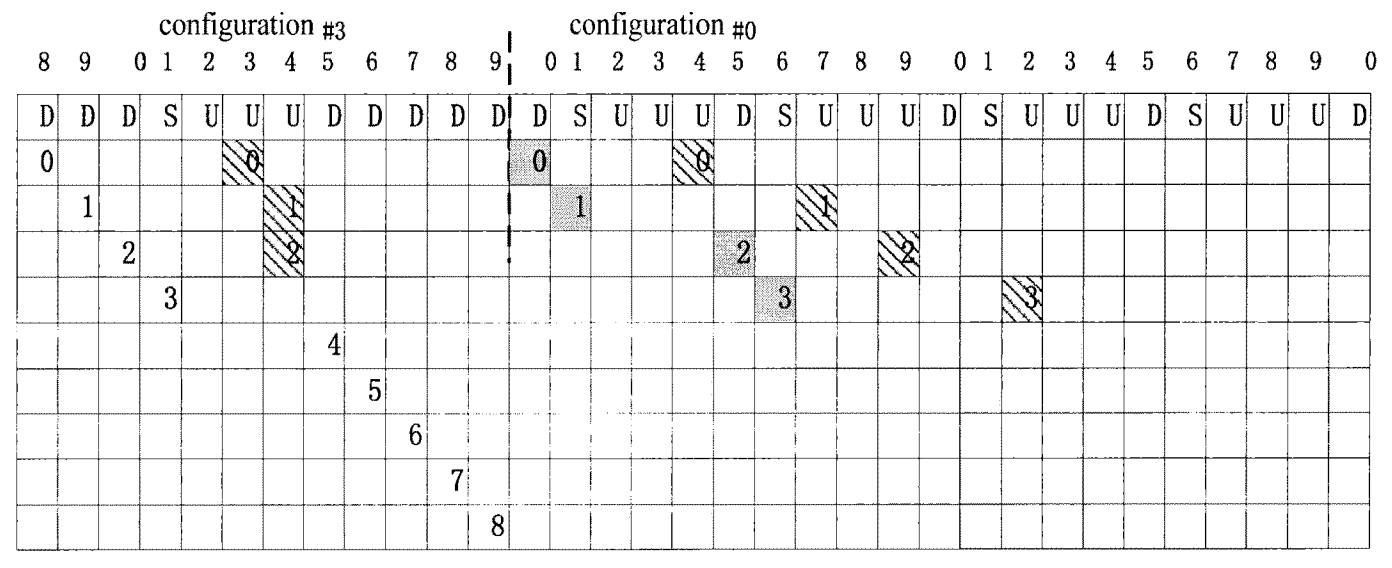

FIG. 13 shows an example of an HARQ process number mapping conflict caused by a dynamic TDD. As shown in FIG. 13, in the case that the uplink/downlink configuration changes from the configuration #3 to configuration #0, since the configuration #0 can provide 4 downlink process number identifications at most while the configuration #3 has 9 downlink processes, a process number mapping conflict will occur.

With the shortening of the uplink/downlink reconfiguration period, a probability that the above conflict occurs in the system increases, and the HARQ performance for the user will reduce increasingly obviously. Hence, in the TDD-LTE dynamic uplink/downlink configuration system, the process number mapping solution needs to be further considered to ensure the user throughput.

Figure 14:
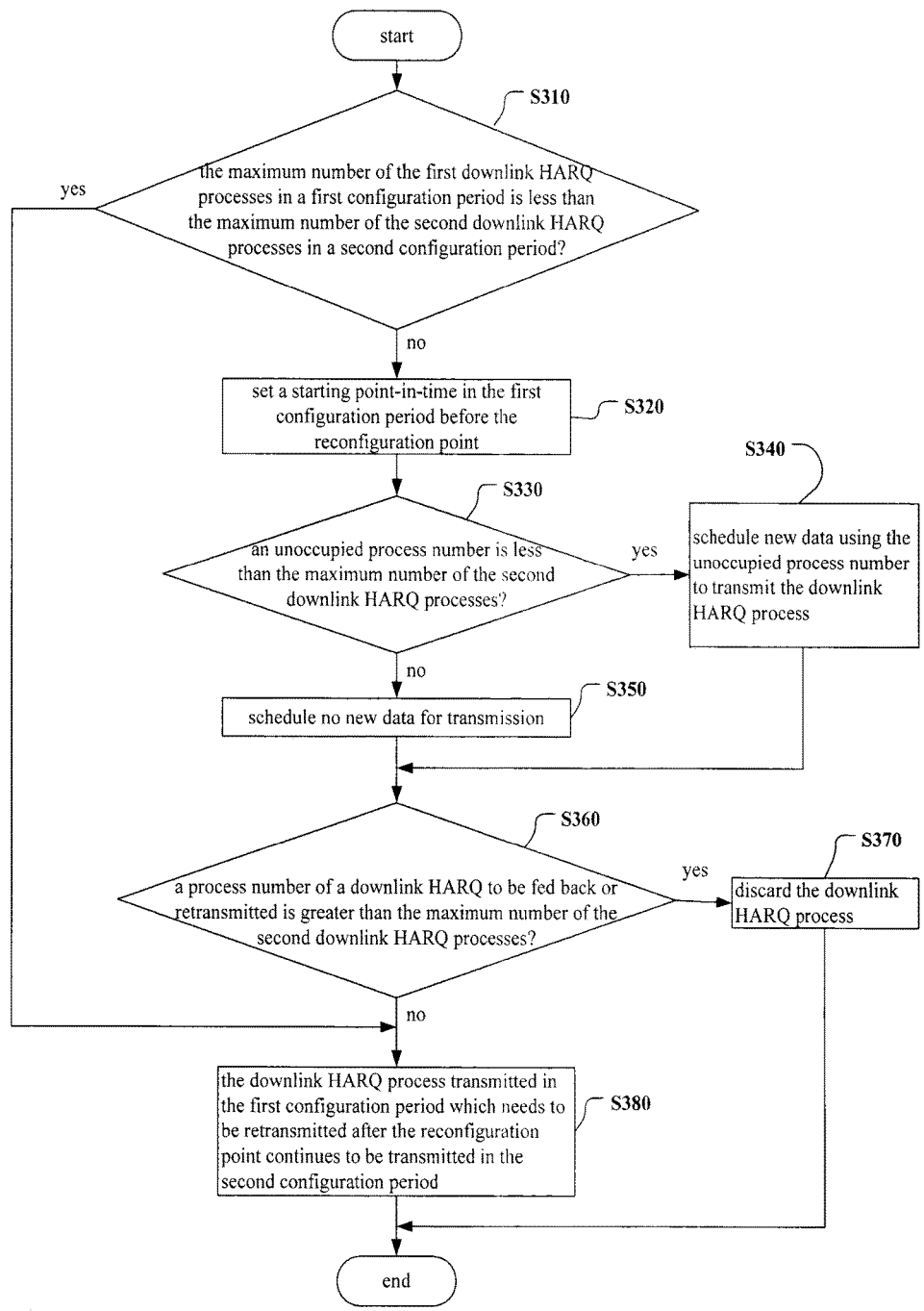
FIG. 14 shows a flowchart for HARQ process number processing according to an embodiment of the present disclosure.

FIG. 14 shows HARQ process number processing according to an embodiment of the present disclosure. The HARQ process number processing shown in FIG. 14 is applicable to both a legacy UE and an R12 UE.

As shown in FIG. 14, in step S310, it is determined whether the maximum number of the first downlink HARQ processes in the first configuration period is less than the maximum number of the second downlink HARQ processes in a second configuration period.

According to the preceding analysis, a process mapping conflict occurs only in the case that the maximum number of processes in a new period is less than the maximum number of processes in an original period. Hence, a dynamic configuration can be classified into the following two cases:

First case: the maximum number of downlink processes in a previous period configuration is less than that in a new period configuration; and Second case: the maximum number of downlink processes in a previous period configuration is greater than that in a new period configuration.

The following table 8 shows the above two cases for the dynamic configuration. In table 8, a number "1" indicates the first case, and a number "2" indicates the second case.

TABLE 8 two cases for the dynamic configuration

| | | new period configuration | | | | | | |
|---|---|---|---|---|---|---|---|---|
| | | #0 | #1 | #2 | #3 | #4 | #5 | #6 |
| previous period configuration | #0 | | 1 | 1 | 1 | 1 | 1 | 1 |
| | #1 | 2 | | 1 | 1 | 1 | 1 | 2 |
| | #2 | 2 | 2 | | 2 | 1 | 1 | 2 |
| | #3 | 2 | 2 | 1 | | 1 | 1 | 2 |

TABLE 8-continued two cases for the dynamic configuration new period configuration

|    | #0 | #1 | #2 | #3 | #4 | #5 | #6 |
|----|----|----|----|----|----|----|----|
| #4 | 2  | 2  | 2  | 2  |    | 1  | 2  |
| #5 | 2  | 2  | 2  | 2  | 2  |    | 2  |
| #6 | 2  | 1  | 1  | 1  | 1  | 1  |    |

In the first case, for all the UEs, since no process number mapping conflict occurs, the process in the previous period may continues to be transmitted and new data may be transmitted through a new added process.

In other words, the process proceeds to step S380, in the case that it is determined "yes" in step S310. In step S380, a downlink HARQ process transmitted in the first configuration period, which needs to be retransmitted after the reconfiguration point, continues to be transmitted in a second configuration period. After step S380, the HARQ process number processing ends.

In the other aspect, if it is determined "no" in step S310, it indicates that the process number mapping conflict may occur, and the process proceeds to step S320.

In step S320, a starting point-in-time for scheduling control is set in the first configuration period before the reconfiguration point.

In the second case, since a process number mapping conflict may occur, HARQ process number mapping processing needs to be performed. The HARQ process number mapping processing may be divided into two parts: scheduling control before the reconfiguration point and process mapping after the reconfiguration point. The starting point-in-time is set to perform scheduling control before the reconfiguration point.

A starting point-in-time may be selected based on a channel condition. The better the channel condition is, the less a probability for data retransmission is, and thereby the closer the selected starting point-in-time is to the reconfiguration point. It is ensured that a latest time-in-point, for which the number of processes needs to be fed back and retransmitted in a previous period is not greater than the maximum number of processes in a new period at the reconfiguration point, is a point-in-time before the reconfiguration point and 3 maximum RTT from the reconfiguration point. In other words, time between the starting time-in-point and the reconfiguration point may be not less than 3 times of the maximum RTT. In the case that time between the starting time-in-point for scheduling control and the reconfiguration point is greater than 3 times of the maximum RTT, it can be ensured that at any channel condition the number of processes to be fed back and retransmitted in the previous period is not greater than the maximum number of processes in a new period at the reconfiguration point. However, in case of good channel condition, the starting point-in-time may be less than 3 times of the maximum RTT from the reconfiguration point. In this case, a process number conflict may occur with a little probability. In addition, the closer the starting time-in-pint for scheduling control is to the reconfiguration point, the higher the resource utilization is.

Subsequently, in step S330, it is determined whether an unoccupied process number is less than the maximum number of the second downlink HARQ processes during the time between the starting point-in-time and the reconfiguration point.

The process proceeds to step S340, in the case that it is determined "yes" in step S330. In step S340, new data is scheduled using the occupied process number to transmit the downlink HARQ process. Here, since the unoccupied process number is less than the maximum number of the second downlink HARQ processes, no process number mapping conflict occurs even if new data is scheduled using the unoccupied process number. It should be noted that, if all the occupied process numbers each is less than the maximum number of the second downlink HARQ processes, no process number mapping conflict occurs either. In this case, the HARQ process number processing may end in fact.

In the other aspect, the process proceeds to step S350, in the case that it is determined "no" in step S330. In step S350, no new data is scheduled for transmission.

In other words, during the time between the starting time-in-point and the reconfiguration point, no new data is scheduled for transmission, in the case that there is no unoccupied process number or all the unoccupied process numbers each is greater than the maximum number of the second downlink HARQ processes. This is due to that, if new data continues to be scheduled at this time instant, a new process number will be greater than the maximum number of the second downlink HARQ processes, and thus a process number mapping conflict may occur with a great probability. It should be noted that, at the time instant, if all the occupied process numbers each is less than the maximum number of the second downlink HARQ processes, no process number mapping conflict occurs. In this case, the HARQ process number processing may end in fact.

Subsequently, in step S360, it is determined whether a process number of a downlink HARQ process to be fed back or retransmitted during the last transmission period before the reconfiguration point is greater than the maximum number of the second downlink HARQ processes.

The process proceeds to step S370, in the case that it is determined "yes" in step S360. In step S370, the downlink HARQ process is discarded. In this case, the downlink HARQ process causing the process number mapping conflict is discarded, hence no process number mapping conflict occurs.

In the other aspect, the process proceeds to step S380, if it is determined "no" in step S360. In this case, no process number mapping conflict occurs, hence the HARQ process number processing may end in fact.

The method for the HARQ process number processing according to the present disclosure is described above by referring to the flowchart of FIG. 14, but the present disclosure is not limited thereto. For example, in the case that the maximum number of the first downlink HARQ processes in the first configuration period is greater than the maximum number of the second downlink HARQ processes in the second configuration period (i.e., it is determined "no" in step S310), the downlink HARQ process transmitted in the first configuration period, which is to be retransmitted after the reconfiguration point, each may be interrupted and retransmitted in the second configuration period, which may also avoid the process number mapping conflict.

More preferably, in the case that the maximum number of the first downlink HARQ processes in the first configuration period is greater than the maximum number of the second downlink HARQ processes in the second configuration period, downlink HARQ processes transmitted in the first configuration period, which are to be retransmitted after the reconfiguration point and process numbers of which are greater than the maximum number of the second downlink HARQ processes, each may be interrupted and retransmitted in the second configuration period; and downlink HARQ processes transmitted in the first configuration period, which are to be retransmitted after the reconfiguration point and process numbers of which are less than or equal to the maximum number of the second downlink HARQ processes, may continue to be transmitted in the second configuration period. In this case, no process number mapping conflict occurs either.

For the legacy UE, based on the scheduling control carried out above, at the reconfiguration point, the number of processes transmitted in a previous period which are to be fed back and retransmitted corresponds to processes of which the process numbers are less than or equal to the maximum number of the second downlink HARQ processes with a great probability (depending on selection of the starting point-in-time). If there is a process of which a process number is greater than the maximum number of the second downlink HARQ processes, the process is discarded. Therefore, no process number mapping is performed for the legacy UE, thereby meeting a requirement of backward compatibility.

Figure 15:
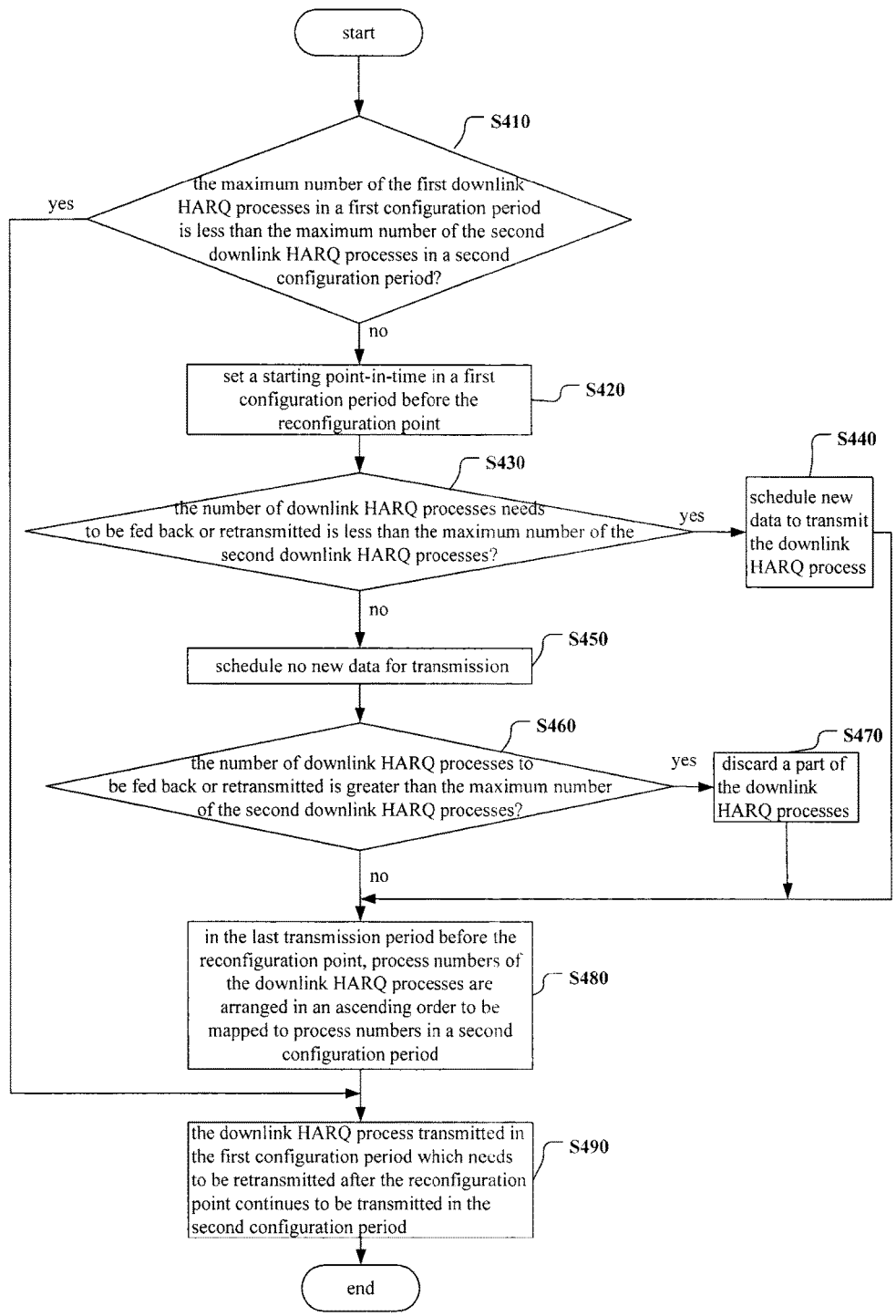
FIG. 15 shows a flowchart for HARQ process number processing according to another embodiment of the present disclosure.

FIG. 15 shows HARQ process number processing according to another embodiment of the present disclosure. The HARQ process number processing shown in FIG. 15 is only applicable to an R12 UE.

As shown in FIG. 15, in step S410, it is determined whether the maximum number of the first downlink HARQ processes in a first configuration period is less than the maximum number of the second downlink HARQ processes in a second configuration period.

Similar to the case described in FIG. 14, the process proceeds to step S490, if it is determined "yes" in step S410. In step S490, a downlink HARQ process transmitted in the first configuration period, which needs to be retransmitted after a reconfiguration point, continues to be transmitted in a second configuration period. After step S490, the HARQ process number processing ends.

In the other aspect, the process proceeds to step S420, if it is determined "no" in step S410. In step S420, a starting point-in-time for scheduling control is set in the first configuration period before the reconfiguration point. Time between the starting point-in-time for scheduling control and the reconfiguration point may be not less than 3 times of the maximum RTT time.

Subsequently, in step S430, it is determined whether the number of downlink HARQ processes need to be fed back or retransmitted during the time between the starting point-in-time and the reconfiguration point is less than the maximum number of the second downlink HARQ processes.

The process proceeds to step S440, if it is determined "yes" in step S430. In step S440, new data is scheduled to transmit the downlink HARQ process. For example, a sum of the number of downlink HARQ processes need to be fed back or retransmitted and the number of transmitted downlink HARQ processes is equal to the maximum number of the second downlink HARQ processes, so as to utilize the downlink resource sufficiently.

Subsequently, in step S480, in the last transmission period before the reconfiguration point, process numbers of downlink HARQ processes are arranged in an ascending order to be mapped to process numbers in the second configuration period.

The processing of step S480 relates to a portion of process mapping after reconfiguration point in the HARQ process number mapping processing. Here, since all process numbers of downlink HARQ processes need to be fed back or retransmitted each is mapped to process numbers in the second configuration period, the process number conflict may be avoided. In addition, it should be noted that, in the second configuration period, the mapped process numbers are used to inform in feeding back or retransmitting the downlink HARQ process transmitted in the first configuration period.

In the other aspect, the process proceeds to step S450, if it is determined "no" in step S430. In step S450, no new data is scheduled for transmission.

In other words, during the time during the starting point-in-time and the reconfiguration point, no new data is scheduled for transmission, in the case that the number of downlink HARQ processes to be fed back or retransmitted is greater than or equal to the maximum number of the second downlink HARQ processes, so as to avoid the process number conflict as much as possible.

Subsequently, in step S460, it is determined whether the number of downlink HARQ processes to be fed back or retransmitted during the last transmission period before the reconfiguration point is greater than the maximum number of the second downlink HARQ processes.

The process proceeds to step S470, if it is determined "yes" in step S460. In step S470, a part of downlink HARQ processes is discarded, such that the number of downlink HARQ processes to be fed back or retransmitted becomes equal to, for example, the maximum number of the second downlink HARQ processes.

In this case, in mapping process numbers in step S480, since the number of downlink HARQ processes to be fed back or retransmitted is not greater than the maximum number of the second downlink HARQ processes, no process number conflict occurs.

For the R12 UE, due to the scheduling control on the data described above, at the reconfiguration point, the number of processes in the previous period which are to be fed back and retransmitted is less than the maximum number of the second downlink HARQ processes with a great probability (depending on selection of the starting point-in-time). These processes are arranged in an ascending order and mapped sequentially to processes in a new period. If the number of processes is greater than the maximum number of the second downlink HARQ processes, the excess processes are discarded. In addition, in feeding back or retransmitting processes in the previous period, the mapped process numbers are used in a control signaling to inform.

Figure 16:
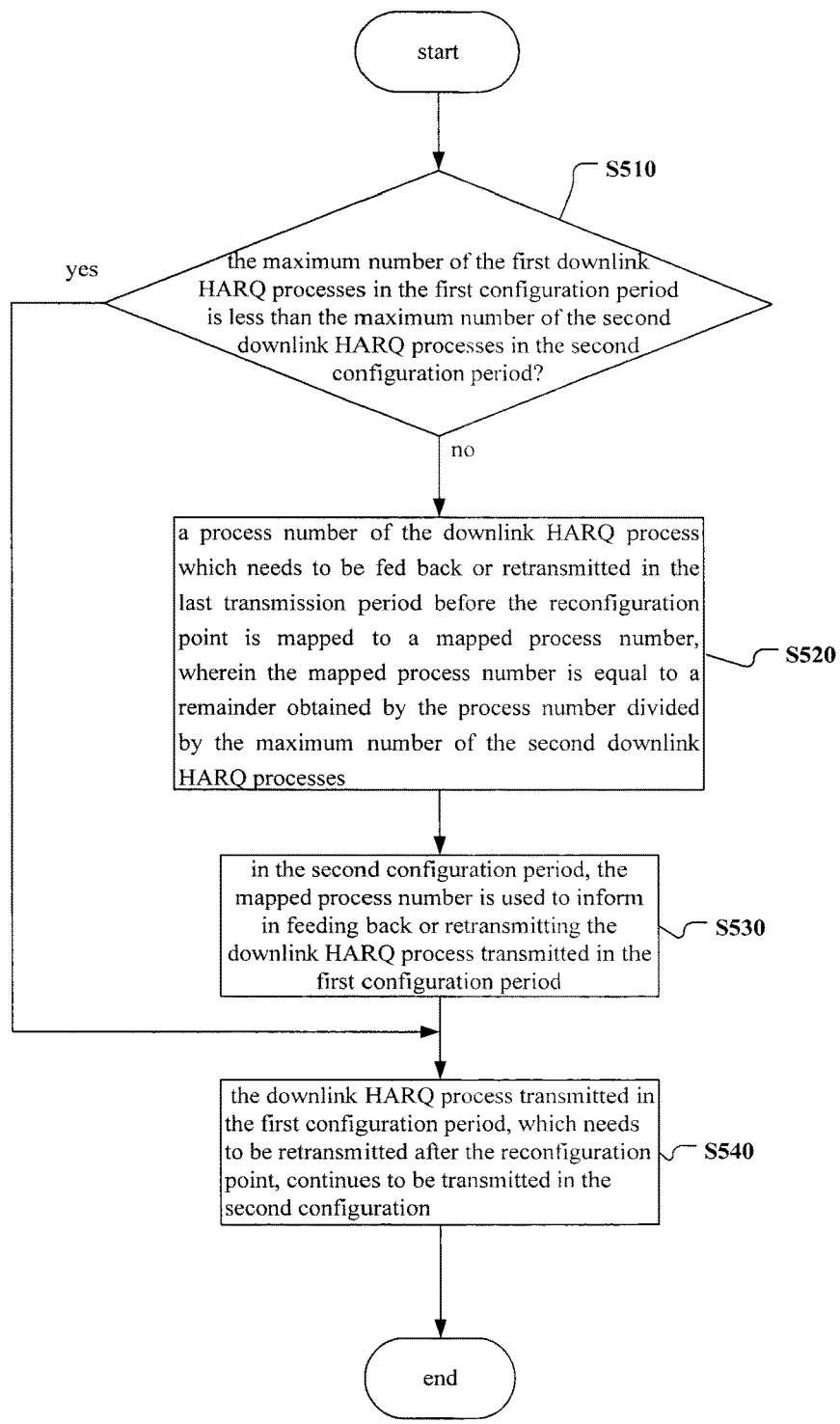
FIG. 16 shows a flowchart for HARQ process number processing according to another embodiment of the present disclosure.

FIG. 16 shows HARQ process number processing according to another embodiment of the present disclosure. Similarly, the HARQ process number processing shown in FIG. 16 is only applicable to the R12 UE.

As shown in FIG. 16, in step S510, it is determined whether the maximum number of the first downlink HARQ processes in a first configuration period is less than the maximum number of the second downlink HARQ processes in a second configuration period.

Similar to the case described in FIG. 14, the process proceeds to step S450, if it is determined "yes" in step S510. In step S540, a downlink HARQ process transmitted in the first configuration period, which is to be retransmitted after the reconfiguration point, continues to be transmitted in the second configuration period. After step S540, the HARQ process number processing ends.

In the other aspect, the process proceeds to step S520, if it is determined "no" in step S510. In step S520, a process number of a downlink HARQ process which is to be fed back or retransmitted in the last transmission period before the reconfiguration point, is mapped to a mapped process number, where the mapped process number is equal to a remainder obtained by the process number divided by the maximum number of the second downlink HARQ processes.

Subsequently, in step S530, in the second configuration period, the mapped process number is used to inform in feeding back or retransmitting the downlink HARQ in the first configuration period.

The main idea of the HARQ process number processing shown in FIG. 16 is that: a process in the previous configuration period to be fed back and retransmitted is mapped to a process in a new configuration period by a certain mapping way, and A/N feedback information and retransmission data for multiple processes mapped to the same process number are distinguished by the counters at a base station end and a UE end.

Specifically, once starting a new configuration, the system performs the HARQ processing from a process of which a process number is 0, and the previous buffers are not emptied, i.e., a capacity of buffers located at the eNodeB end and the UE end is still equal to the maximum number of HARQ processes in the previous period.

In the new configuration period, HARQ processes in a previous period which are still to be fed back and retransmitted are fed back and retransmitted in an order of a time sequence. If a process having a process number N greater than or equal to the maximum number of HARQ processes $PN_{max}$ need to be fed back or retransmitted, a process number informed in the control signaling is PN=mod (N, $PN_{max}$), in which the operator "mod" indicates a mod operation. In this way, all the process numbers in the previous period each is mapped to process numbers in the next period, thereby avoiding the process number conflict.

Subsequently, a process of how the eNodeB and the UE determine an HARQ process N in the previous period corresponding to the PN based on the same PN and perform corresponding operation in a buffer will be described.

Figure 17:
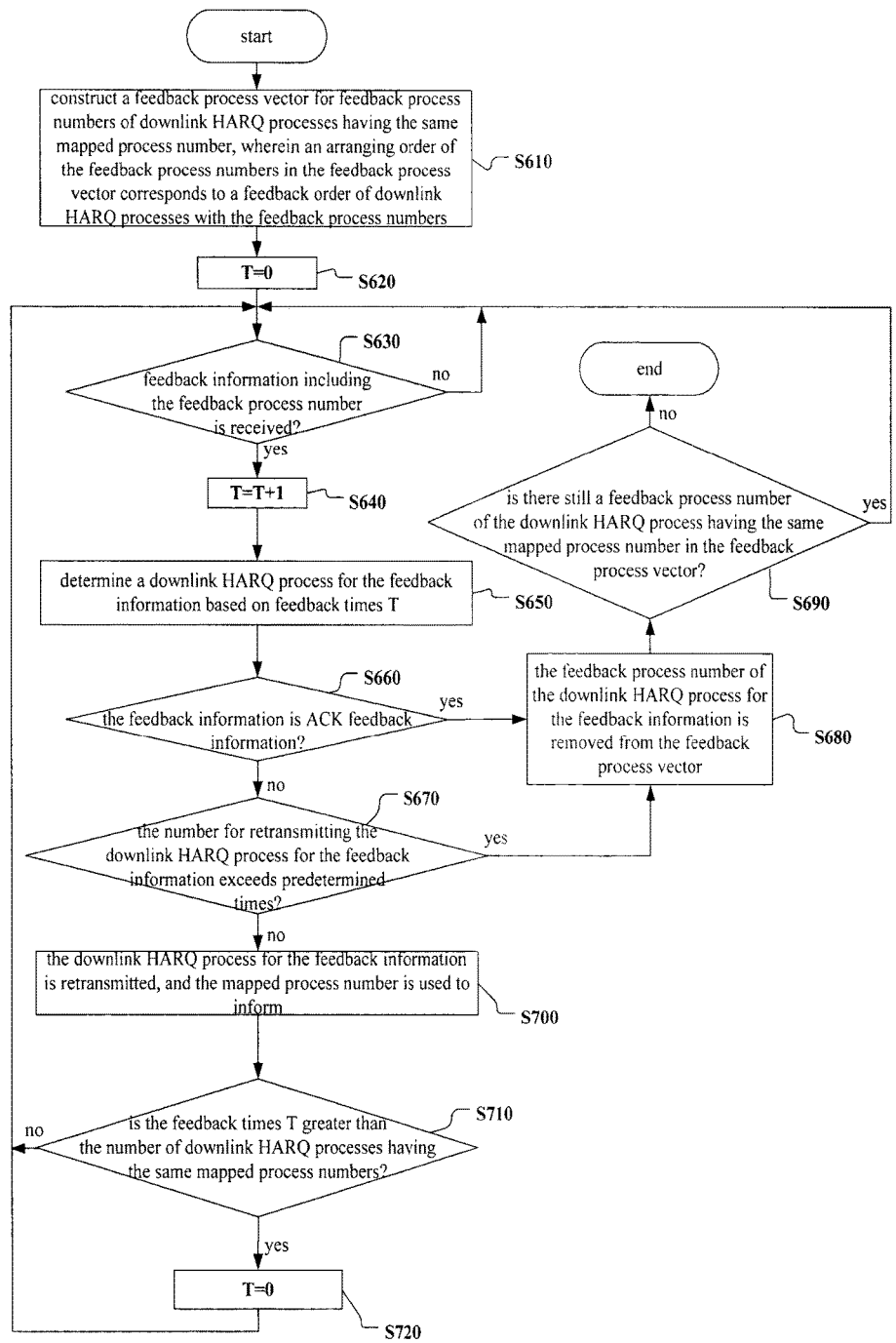
FIG. 17 shows a flowchart for HARQ process number processing performed on a side of a base station according to another embodiment of the present disclosure.

FIG. 17 shows HARQ process number processing performed at a base station side according to another embodiment of the present disclosure.

As shown in FIG. 17, in step S610, a feedback process vector is constructed for feedback process numbers of downlink HARQ processes having the same mapped process number, wherein an arranging order of the feedback process numbers in the feedback process vector corresponds to a feedback order of downlink HARQ processes with the feedback process numbers.

It is assumed that among processes having the same process number PN=mod(N,$PN_{max}$) in the previous configuration period, k processes are not received correctly or it is not determined whether the k processes are received correctly, and k corresponding process numbers are $\{N_0, N_1, \ldots, N_{k-1}\}$ in an ascending order respectively, wherein after the reconfiguration point, a process number for a first feedback is $N_{fd0}=N_i$. A feedback process vector $F_{PN}=(N_{fd0}, N_{fd1}, \ldots, N_{fdk-1})=(N_i, N_{i+1}, \ldots, N_{k-1}, N_0, N_1, \ldots, N_{i-1})$ may be constructed. The feedback process vector includes $k_{fd}=k$ elements.

Subsequently, in step S620, feedback times T is set to be 0.

Subsequently, in step S630, it is determined whether feedback information including the feedback process number is received.

If it is determined "no" in step S630, it continues to wait to receive the feedback information. In the other aspect, the process proceeds to step S640, if it is determined "yes" in step S630. In step S640, the feedback information is counted to obtain the feedback times.

Subsequently, in step S650, a downlink HARQ process for the feedback information is determined based on the feedback times.

Subsequently, in step S660, it is determined whether the feedback information is ACK feedback information. The process proceeds to step S680, if it is determined "yes" in step S660. In step S680, a feedback process number of the downlink HARQ process for the feedback information is removed from the feedback process vector.

Subsequently, in step S690, it is determined whether there still is a feedback process number of a downlink HARQ process having the same mapped process number in the feedback process vector.

The process returns to step S630, if it is determined "yes" in step S690. In the other aspect, the HARQ process number processing performed at the base station side ends, if it is determined "no" in step S690.

In another aspect, if it is determined "no" in step S660, it indicates that the feedback information is NACK feedback information. In this case, the downlink HARQ process for the feedback information is retransmitted, and the mapped process number is used to inform, as described in step S700 in FIG. 17.

Furthermore, if multiple pieces of NACK feedback information are received, a downlink HARQ process for each of the multiple pieces of NACK feedback information may be retransmitted. In addition, if a feedback process number of one downlink HARQ process to be retransmitted is arranged prior to a feedback process number of another downlink HARQ process to be retransmitted in the feedback process vector, the one HARQ process may be retransmitted before the another downlink HARQ process is retransmitted. In this way, it is ensured that an arranging order of subsequent feedback process numbers in the feedback process vector corresponds to a feedback order of downlink HARQ processes having the feedback process numbers.

Furthermore, as described in step S670 in FIG. 17, if the feedback information is NACK feedback information and the number for retransmitting the downlink HARQ process for the feedback information exceeds predetermined times, a feedback process number of the downlink HARQ process for the feedback information is removed from the feedback process vector.

Subsequently, in step S710, it is determined whether the feedback times T is greater than the number of downlink HARQ processes having the mapped process number.

The process returns to step S630, in the case that it is determined "no" in step S710. In the other aspect, the process proceeds to step S720, in the case that it is determined "yes" in step S710. In step S720, the feedback times T is emptied. Subsequently, the process returns to step S630 to recount the feedback information.

For example, in the case that the eNodeB receives ACK/NACK feedback for the process number PN, times T for receiving all the ACK/NACK feedback for the process number PN starting from the reconfiguration point is recorded via a counter, and the following determination is performed.

a) If T=1, it indicates feedback information for a process number $N_{fd0}=N_i$ in a previous period. If the feedback is ACK, $N_{fd0}$ is removed from $F_{PN}$ after all the feedback information in this cycle each is received, and $k_{fd}=k_{fd}-1$. In the other aspect, if the feedback is NACK, retransmission data is sent in a subframe after at least 4 subframes and the process number in the control signaling is PN.

b) If T=2, it indicates feedback information for a process number $N_{fd1}=N_{i+1}$ in a previous period. If the feedback is ACK, $N_{fd1}$ is removed from $F_{PN}$ after all the feedback information in this cycle each is received, and $k_{fd}=k_{fd}-1$. In the other aspect, if the feedback is NACK, retransmission data is sent in a subframe after at least 4 subframes and later than the retransmission subframe in a) (if there is a retransmission subframe), and the process number in the control signaling is PN.

c) Similarly, if T=m (m≤k), it indicates feedback information for a process number $N_{fd(m-1)}$ in a previous period. If the feedback is ACK, $N_{fd(m-1)}$ is removed from $F_{PN}$ after all the feedback information in this cycle each is received, and $k_{fd}=k_{fd}-1$. In the other aspect, if the feedback is NACK, retransmission data is sent after at least 4 subframes and later than all the the retransmission subframes above (if there is a retransmission subframe), and the process number in the control signaling is PN.

d) If T>k and correct ACK feedback for all the subframes $N_i > PN_{max}$ in the previous period is obtained, it may be transmitted normally in an HARQ time sequence of a new period; otherwise set T=0 and $k=k_{fd}$, then it starts to cycle from a).

In addition, there is a special case for process number mapping. In the case that after the reconfiguration point the UE feeds back ACK/NACK information for the first time, m (m≤k) processes having the same $PN=\text{mod}(N,PN_{max})$ in the previous reconfiguration period may be transmitted in the same subframe. In this case, since the PN indicated is same and it is fed back simultaneously, m pieces of feedback information can not be distinguished, and a conflict may be expected. Therefore, for the special case, the mapping way for process numbers needs to be changed.

Specifically, if m pieces of feedback information having the feedback process number are transmitted in the same subframe in a first transmission period after the reconfiguration point, where m is a natural number greater than 1, process numbers of m downlink HARQ processes for the m pieces of feedback information are adjusted during a process for mapping the process numbers of the m downlink HARQ processes to mapped process numbers, such that 0, 1, . . . , m-1 are sequentially added to the process numbers of the m downlink HARQ processes in an ascending order of the process numbers of the m downlink HARQ processes to obtain the adjusted process numbers of the m downlink HARQ processes, and the mapped process numbers of the m downlink HARQ processes are equal to remainders obtained by the adjusted process numbers divided by the maximum number of the second downlink HARQ processes.

In other words, the process number mapping way for m-1 processes having greater process numbers needs to be changed. Set $PN'=(N+x)\% PN_{max}$, x=1, . . . ,m-1, in this case N is grouped to a process group having the same $PN'=\text{mod}(N',PN_{max})$ and the above operation is performed.

In the case that all data in the previous period each are received correctly, an HARQ process for new data is performed based on stipulations in the new configuration.

Figure 18:
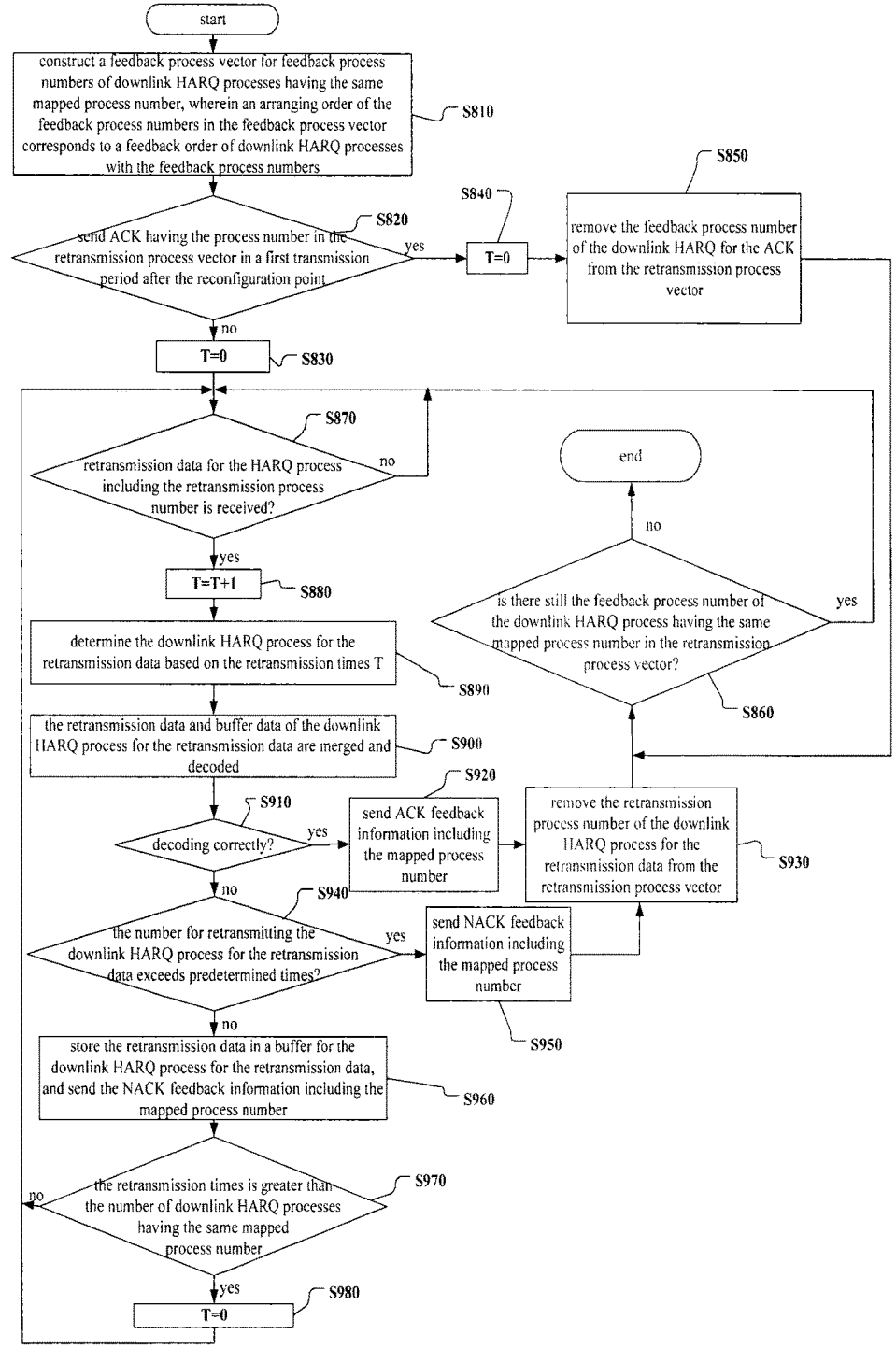
FIG. 18 shows a flowchart for HARQ process number processing performed on a side of a communication terminal according to another embodiment of the present disclosure.

FIG. 18 shows HARQ process number processing performed at a communication terminal side according to another embodiment of the present disclosure.

As shown in FIG. 18, in step S810, a retransmission process vector is constructed for retransmission process numbers of downlink HARQ processes having the same mapped process number, wherein an arranging order of the retransmission process numbers in the retransmission process vector corresponds to a retransmission order of downlink HARQ processes with the retransmission process numbers.

Similarly, it is assumed that among processes having the same process number $PN=\text{mod}(N,PN_{max})$ in the previous reconfiguration period, k processes are not received correctly, or it is not determined whether the k processes are received correctly, and k corresponding process numbers are $\{N_0, N_1, \ldots, N_{k-1}\}$ in an ascending order respectively, wherein after the reconfiguration point, a process number for a first retransmission is $N_{re0}=N_i$. A retransmission process vector $F_{PN}=(N_{fd0},N_{fd1},\ldots,N_{fdk-1})=(N_i,N_{i+1},\ldots,N_{k-1},N_0,N_1,\ldots,N_{i-1})$ may be constructed. The retransmission process vector includes $k_{re}=k$ elements.

Subsequently, in step S820, it is determined whether ACK feedback information having the retransmission process number in the retransmission process vector is sent in a first transmission period after the reconfiguration point.

The process proceeds to step S840, if it is determined "yes" in step S820. In step S840, retransmission times are set to be zero.

Subsequently, in step S850, a retransmission process number of a downlink HARQ process for the ACK feedback information is removed from the retransmission process vector.

Subsequently, in step S860, it is determined whether there still is a retransmission process number of a downlink HARQ process having the same mapped process number in the retransmission process vector.

The HARQ process number processing performed on the communication terminal side ends, if it is determined "no" in step S860. In the other aspect, the process proceeds to step S870 for continuous processing, if it is determined "yes" in step S860.

In the other aspect, the process proceeds to step S830, if it is determined "no" in step S820. In step S830, the retransmission times are also set to be zero.

Subsequently, in step S870, it is determined whether retransmission data of the downlink HARQ processes having the retransmission process number is received. It continues to wait to receive the retransmission data, if it is determined "no" in step S870. In the other aspect, the process proceeds to step S880, if it is determined "yes" in step S870.

In step S880, the downlink HARQ processes are counted to obtain retransmission times T.

Subsequently, in step S890, a downlink HARQ process for the retransmission data is determined based on the retransmission times T.

Subsequently, in step S900, the retransmission data and buffer data for the downlink HARQ process for the retransmission data are merged and decoded.

Subsequently, in step S910, it is determined whether the decoding is correct. The process proceeds to step S920, if it is determined "yes" in step S910. In step S920, ACK feedback information including the mapped process number is sent out.

Subsequently, in step S930, the retransmission process number of the downlink HARQ process for the retransmission data is removed from the retransmission process vector. Subsequently, the process proceeds to step S860 for continuous determination.

In the other aspect, the process proceeds to step S940, if it is determined "no" in step S910.

In step S940, it is determined whether the number for retransmitting the downlink HARQ process for the retransmission data exceeds predetermined times. The process proceeds to step S950, if it is determined "yes" in step S940. In step S950, NACK feedback information including the mapped process number is sent out. Subsequently, the process proceeds to step S930, the retransmission process number of the downlink HARQ process for the retransmission data is removed from the retransmission process vector, and continues to perform the next processing.

In the other aspect, the process proceeds to step S960, if it is determined "no" in step S940. In step S960, the retransmission data is stored in a buffer for the downlink HARQ process for the retransmission data, and NACK feedback information including the mapped process number is sent out.

Subsequently, in step S970, it is determined whether the retransmission times T is greater than the number of the downlink HARQ processes having the same mapped process number. The process returns to step S870 to continue receiving the retransmission data, if it is determined "no" in step S970. In the other aspect, the process proceeds to step S980, if it is determined "yes" in step S970. In step S980, the retransmission times are emptied, and the process returns step S870 to recount the downlink HARQ processes.

Since a part of processes in the retransmission process vector $R_{PN}=(N_{re0},N_{re1}, \ldots, N_{rek-1})=(N_j, N_{j+1}, \ldots, N_{k-1}, N_0, N_1, \ldots, N_{j-1})$ have not been decoded (processing time delay), it is not determined whether the part of processes are to be fed back at the reconfiguration point. If theses processes can be decoded correctly, the UE will not receive an expected retransmission process, therefore theses retransmission processes need to be synchronized with ACK/NACK information sent from the UE in a first round of cycle, i.e., the UE sends ACK feedback to a process $N_{re,1}$ while the $N_{re,1}$ is deleted from the retransmission process vector $R_{PN}$, and $k_{re}=k_{re}-1$, $k=k-1$. The retransmission vector is changed in the first cycle simultaneously with the retransmission process processing.

For example, in the case that the UE receives retransmission data for the process number PN, times T for receiving the retransmission data for the process number PN starting from the reconfiguration point is recorded via a counter, and the following determination is performed.

a), if T=1, it indicates retransmission data for a process number $N_{re0}=N_j$ in a previous period, and the retransmission data and a buffer for a process $N_j$ are merged and decoded. If it is decoded correctly, the process $N_{re0}$ is deleted from $R_{PN}$ when the round of cycle ends, $k_{re}=k_{re}-1$, and ACK information is sent in a subframe stipulated by the time sequence, informing that the process number is PN via a control signaling. If it is not decoded correctly, the received data is stored in a buffer for the process $N_{re0}$ temporally, NACK information is sent in a subframe stipulated by the time sequence, and it is informed that the process number is PN via the control signaling.

b) If T=2, it indicates retransmission data for $N_{re1}=N_{j+1}$ in the previous period, and the retransmission data and a buffer for a process $N_{j-1}$ are merged and decoded. If it is decoded correctly, the process $N_{re1}$ is deleted from $R_{PN}$ when the round of cycle ends, $k_{re}=k_{re}-1$, and ACK information is sent in a subframe stipulated by the time sequence, informing that the process number is PN via a controlling signaling. If it is not decoded correctly, the received data is stored in a buffer for the process $N_{re1}$ temporally, NACK information is sent in a subframe stipulated by the time sequence, and it is informed that the process number is PN via the control signaling.

c) Similarly, if T=m (m≤k), it indicates retransmission data for a process number $N_{re(m-1)}$ in the previous period, and the retransmission data and a buffer for a process $N_{(m-1)}$ are merged and decoded. If it is decoded correctly, the process $N_{re(m-1)}$ is deleted from $R_{PN}$ when the round of cycle ends, $k_{re}=k_{re}-1$, and ACK information is sent in a subframe stipulated by the time sequence, informing that the process number is PN via the controlling signaling. If it is not decoded correctly, the received data is stored in a buffer for the process $N_{re(m-1)}$ temporally, NACK information is sent in a subframe stipulated in the time sequence, and it is informed that the process number is PN via the controlling signaling.

d) If T>k, all the subframes having a subframe number $N_i>PN_{max}$ in the previous period each is decoded correctly, no data need to be retransmitted, and it may be transmitted normally based on the HARQ time sequence in a new period; otherwise set T=0 and $k=k_{re}$, and the process starts to cycle from a).

In the case that all data in the previous period each is received correctly, the HARQ process for new data is performed based on stipulations in the new configuration.

Figure 19:
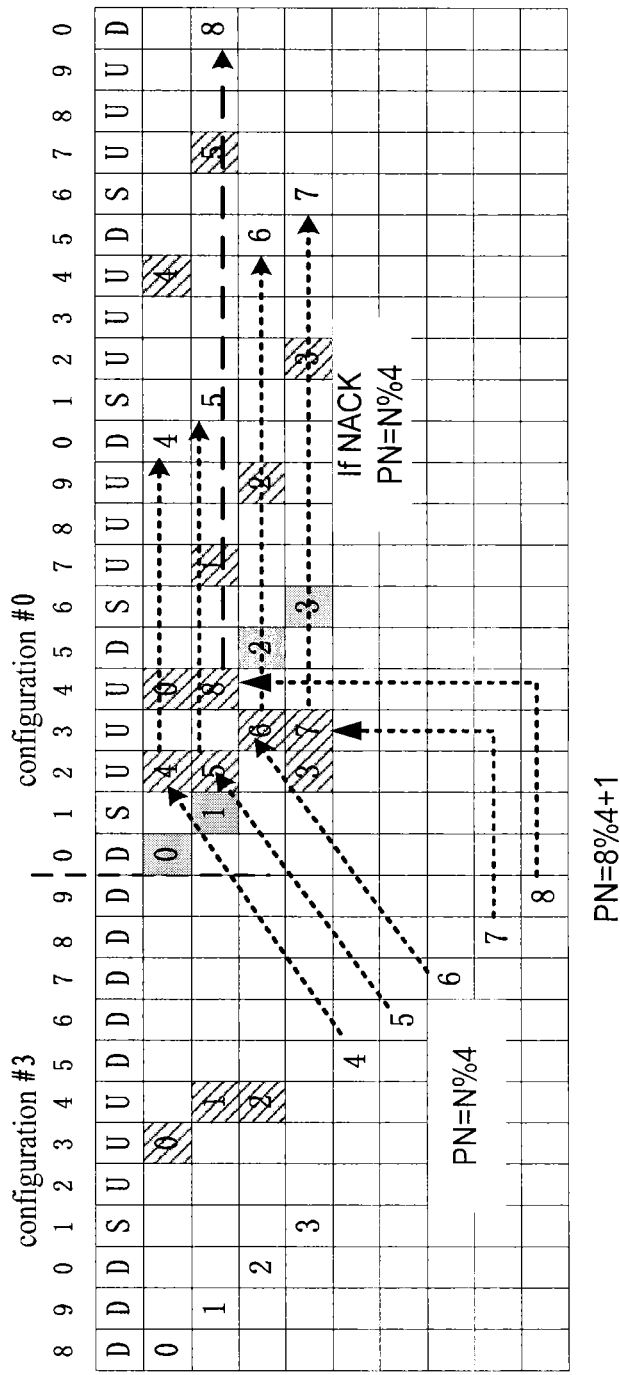
FIG. 19 shows a schematic diagram of an example of HARQ process number processing according to an embodiment of the present disclosure.

Hereinafter the HARQ process number processing solution according to an embodiment of the present disclosure is illustrated in conjunction with specific examples. FIG. 19 shows an example of HARQ process number processing according to the embodiment of the present disclosure.

As shown in FIG. 19, in the case that the downlink configuration changes from configuration #3 to configuration #0, then $PN_{max}=4$ and PN={0,1,2,3}. It is assumed that processes 0 to 8 in the previous period each needs to be retransmitted, and according to corresponding mod relation, feedback data and retransmission data for three processes having process numbers N=0, 4, 8 in the previous configuration need to be transmitted in an HARQ process having a process number PN=0 in a new period, and correspondingly K=3. However, in an uplink subframe 4, ACK/NACK information are transmitted simultaneously in two processes having process numbers N=0 and N=8. Therefore, the process having the process number N=8 should be mapped to a process having a process number PN'=(N+1)% 4=1 (the process 8 is mapped to the process 1, but time for feedbacking ACK/NACK of the process 8 is still in the subframe 4).

A process having a process number PN=1 is considered. In the previous configuration period, processes {1, 5, 8} are mapped to PN=1. In the new configuration period, the process N=5 receives the feedback information firstly (NACK feedback for N=1 has been received in the previous configuration period), and the process N=1 will retransmit firstly. A feedback process vector $F_1=[N_{fd0},N_{fd1},N_{fd2}]=[5,8,1]$ may be constructed, and a retransmission process vector $R_1=[N_{re0},N_{re1},N_{re2}]=[1,5,8]$ may be constructed.

At the eNodeB end, feedback information $N_{fd0}$ for a first process number PN=1 is received, which is NACK in the example, and in this case T=1. It may be determined that the received feedback information is NACK feedback information for a process N=5 in the previous configuration period. Feedback information $N_{fd1}$ for a second process number PN=1 is received, which is NACK in the example, and in this case T=2. It may be determined that the received feedback information is NACK feedback information for a process N=8 in the previous configuration period. Feedback information $N_{fd2}$ for a third process number PN=1 is received, which is NACK feedback in the example, and in this case T=3. It may be determined that the received feedback information is NACK feedback information for a process N=1 in the previous configuration period. The eNodeB distributes the downlink resource for data retransmission in an order in which the NACK feedback information is received.

In the case that a fourth NACK feedback is received, then T>3. Now, it is considered which of processes {1, 5, 8} receives ACK information without retransmission. In the example, since all the feedback information is NACK, in this case k is still 3 and the above process is repeated. In the case that a process N=i (i=1, 5, 8) receives ACK feedback, then k=k-1, and the process number is removed from the feedback process vector. In the case that all the processes N={1, 5, 8} each completes retransmission (data transmission is correct or the maximum retransmission times are reached), the eNodeB transmits new data based on an HARQ process of a new configuration.

Similarly, at the UE end, retransmission data $N_{re0}$ for a first process number PN=1 is received, in this case T=1, and it may be determined that the received retransmission data is retransmission data for the process N=1 in the previous configuration period. The retransmission data and data in a buffer for the N=1 are merged and decoded, corresponding ACK/NACK information (NACK in the example) is replied in the stipulated time sequence, and the process number PN=1 is sent out. Retransmission data $N_{re1}$ for a second process number PN=1 is received, in this case T=2, and it may be determined that the received retransmission data is retransmission data for a process N=5 in the previous configuration period. The retransmission data and data in a buffer for N=5 are merged and decoded, and corresponding ACK/NACK information (NACK in the example) is replied in the stipulated time sequence, and the process number PN=1 is sent out. Retransmission data $N_{re2}$ for a third process number PN=1 is received, in this case T=3, and it may be determined that the received retransmission data is retransmission data for a process N=8 in the previous configuration period. The retransmission data and data in a buffer for N=8 are merged and decoded, corresponding ACK/NACK information (NACK in the example) is replied in the stipulated time sequence, and the process number PN=1 is sent out.

In the case that a fourth NACK feedback is received, then T>3. Now, it is considered which of processes N={1, 5, 8} have been decoded successfully without retransmission. In the example, k is still 3, hence the above process is repeated. In the case that the process N=i (i=1, 5, 8) is received correctly, then k=k-1, and the process number is removed from the retransmission process vector. In the case that all the processes N={1, 5, 8} each completes retransmission, the UE continues to receive and feed back new data based on the HARQ of the new configuration.

According to the disclosed embodiment, the method for coordinating the HARQ time sequence in the TDD universal mobile telecommunications system (UMTS) and an LTE dynamic uplink/downlink configuration system is provided. The present disclosure may be applied to a homogeneous or heterogeneous network in a TDD mode. The present disclosure includes HARQ time sequence processing and HARQ process number processing. The process mapping conflict for a dynamic TDD system may be solved by the HARQ process number processing, such that the HARQ process performed in the previous configuration period can be performed smoothly in the new configuration period.

According to the HARQ time sequence processing and the HARQ process number processing of the present disclosure, the legacy UE may have backward compatibility, and the R12 UE may have good resource utilization and low transmission time delay.

Figure 20:
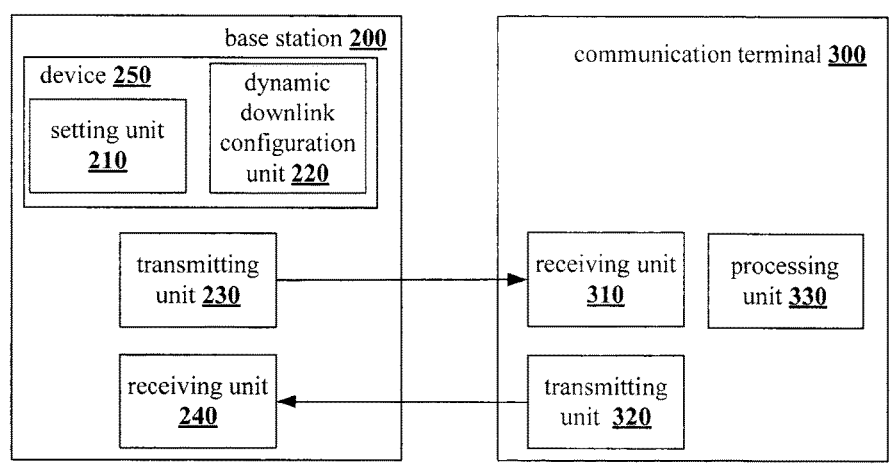
FIG. 20 shows a block diagram of a wireless communication system according to an embodiment of the present disclosure.

Hereinafter a wireless communication system according to an embodiment of the present disclosure is described in conjunction with FIG. 20. As shown in FIG. 20, the wireless communication system 100 according to the embodiment of the present disclosure includes a base station 200 and a communication terminal 300.

The base station 200 may include a device 250, a transmitting unit 230 and a receiving unit 240 on the base station side. The device 250 may include a setting unit 210 and a dynamic downlink configuration unit 220.

The setting unit 210 may be configured to set a reconfiguration point, such that a first uplink/downlink subframe configuration is adopted in a first configuration period before the reconfiguration point and a second uplink/downlink subframe configuration is adopted in a second configuration period after the reconfiguration point.

The dynamic downlink configuration unit 220 may be configured to perform dynamic downlink configuration, such that a reference uplink/downlink subframe configuration adapted for an uplink subframe intersection of respective uplink/downlink subframe configurations is adopted for a time sequence of a downlink HARQ process during the predetermined change of the dynamical downlink configuration.

According to the embodiment of the present disclosure, alternatively, the dynamic downlink configuration unit 220 may also be configured to perform dynamic downlink configuration, such that at a boundary frame which is the last frame sent before the reconfiguration point, retransmission or initial data transmission of a downlink HARQ process is stopped.

The transmission unit 230 may be configured to send a signaling to the communication terminal 300 to inform the communication terminal 300 of information on a dynamic downlink configuration. In addition, the transmission unit 230 may further be configured to transmit or retransmit data to the communication terminal 300 based on the dynamic downlink configuration.

The receiving unit 240 may be configured to receive feedback information sent from the communication terminal 300 based on the dynamic downlink configuration.

The reference uplink/downlink subframe configuration may include configuration #4, configuration #2 and configuration #5.

The communication terminal 300 may include a receiving unit 310, a transmission unit 320 and a processing unit 330. The receiving unit 310 may receive the signaling sent from the transmitting unit 230 to obtain the information on the dynamic downlink configuration, and receive the data transmitted or retransmitted by the transmitting unit 230 based on the dynamic downlink configuration performed by the dynamic downlink configuration unit 220. The processing unit 230 may decode the data received by the receiving unit 310 based on the dynamic downlink configuration performed by the dynamic downlink configuration unit 220. The processing unit 230 may perform the HARQ process number processing described above, which is not described here. The transmitting unit 320 may send feedback information to the receiving unit 240 based on the dynamic downlink configuration performed by the dynamic downlink configuration unit 220 and a decoding result of the processing unit 230, wherein a reference uplink/downlink subframe configuration adapted for an uplink subframe intersection of respective uplink/downlink subframe configuration is adopted for a time sequence of a downlink HARQ process during the predetermined change of the dynamical downlink configuration.

The reference uplink/downlink subframe configuration may include configuration #4, configuration #2 and configuration #5.

Figure 21:
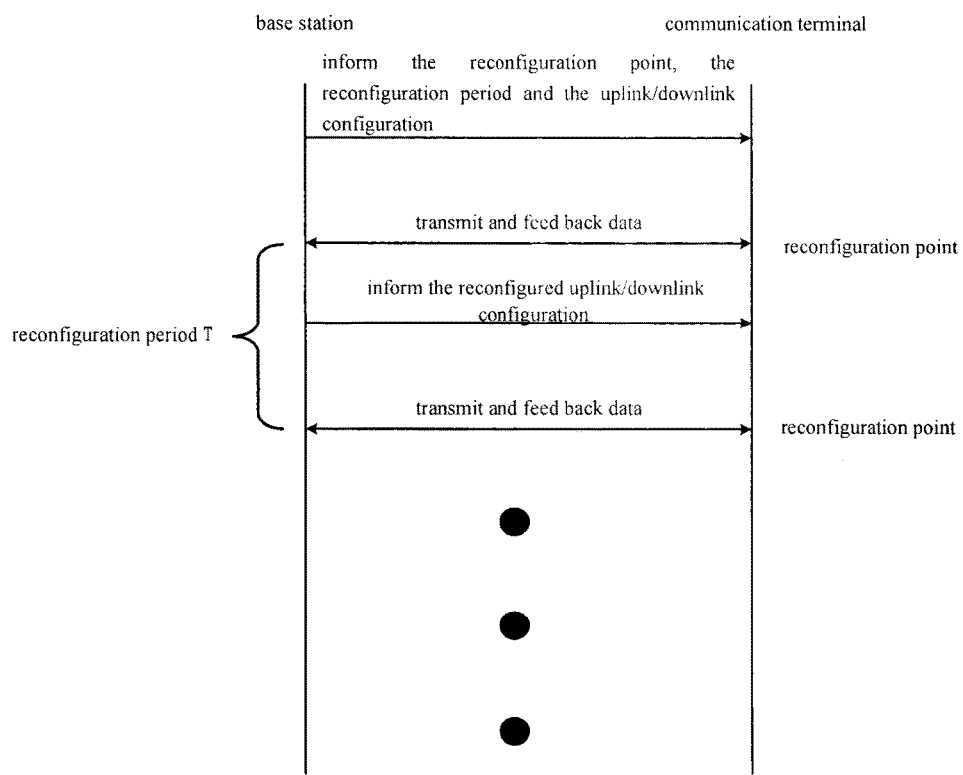
FIG. 21 shows a time sequence diagram of a periodic reconfiguration of a downlink HARQ process performed between a base station and a communication terminal.

FIG. 21 shows a time sequence diagram for periodic reconfiguration of a downlinkA7 HARQ process performed between the base station and the communication terminal. As shown in FIG. 21, in case of periodic reconfiguration, the base station informs the communication terminal of the reconfiguration point, the reconfiguration period and the uplink/downlink configuration in advance. Subsequently, data is transmitted and fed back between the base station and the communication terminal. In case of reaching the reconfiguration point, the base station and the communication terminal may perform a dynamic uplink/downlink configuration based on the uplink/downlink configuration way informed in advance, and transmit and feed back data between the base station and the communication terminal based on the new uplink/downlink configuration. Subsequently, before reaching a next reconfiguration point, the base station may inform the communication terminal of the reconfigured uplink/downlink configuration. Since the reconfiguration point and the reconfiguration period are fixed in case of periodic reconfiguration, it is not necessary to inform the reconfiguration point and the reconfiguration period again. In case of reaching a new reconfiguration point, the base station and the communication terminal may perform a dynamic uplink/downlink configuration based on the reconfigured uplink/downlink configuration way, and transmit and feed back data between the base station and the communication terminal based on the reconfigured uplink/downlink configuration.

Figure 22:
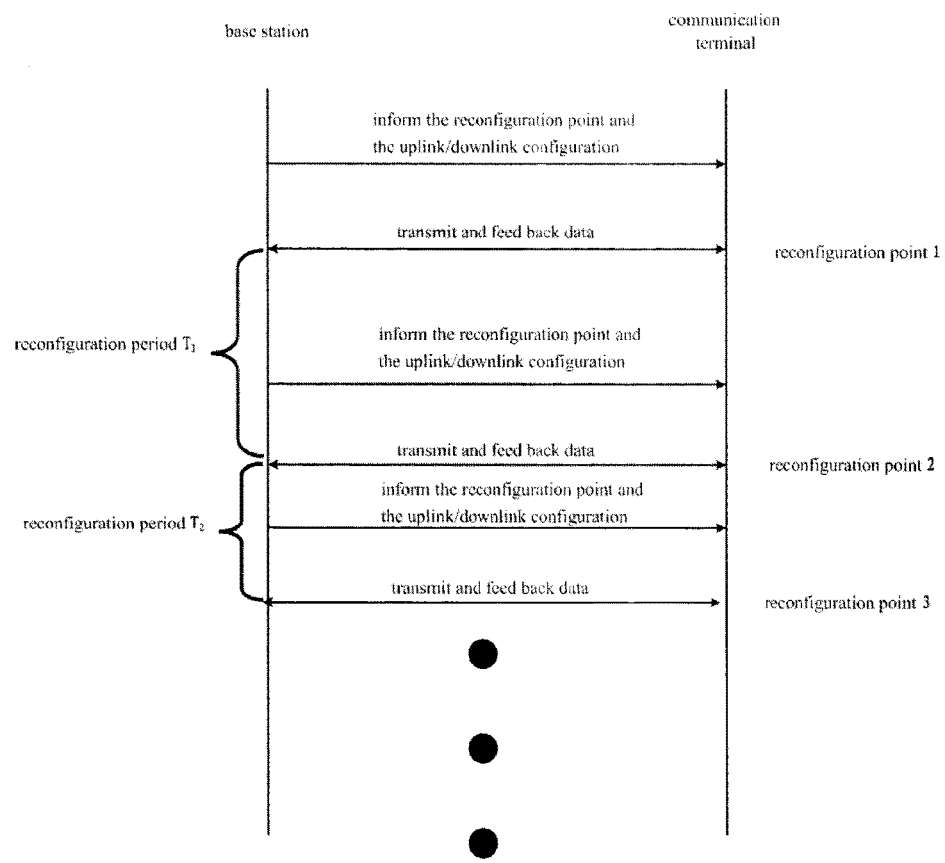
FIG. 22 shows a time sequence diagram of a non-periodic reconfiguration of a downlink HARQ process performed between a base station and a communication terminal.

FIG. 22 shows a time sequence diagram for non-periodic reconfiguration of a downlink HARQ process performed between the base station and the communication terminal. As shown in FIG. 22, in case of non-periodic reconfiguration, the base station informs the communication terminal of a reconfiguration point and an uplink/downlink configuration before a reconfiguration point 1. In case of reaching the reconfiguration point 1, the base station and the communication terminal may perform a dynamic uplink/downlink configuration based on the informed uplink/downlink configuration way, and transit and feed back data between the base station and the communication terminal based on the informed uplink/downlink configuration during a reconfiguration period T1. Subsequently, the base station may inform, during the reconfiguration period T1, the communication terminal of a next reconfiguration period (i.e, reconfiguration point 2 for a reconfiguration period $T_2$) and an uplink/downlink configuration. Since the reconfiguration point and the reconfiguration period are unfixed in case of the non-periodic reconfiguration, a new reconfiguration point needs to be informed. In case of reaching the reconfiguration point 2, the base station and the communication terminal may perform a dynamic uplink/downlink configuration based on the informed new uplink/downlink configuration way, and transmit and feed back data between the base station and the communication terminal based on the informed new uplink/downlink configuration during the reconfiguration period $T_2$.

The base station may inform the user terminal of the reconfiguration point (the reconfiguration period) and the uplink/downlink configuration by adopting a physical (PHY) layer signaling, a media access control (MAC) layer signaling or a radio resource control (RRC) layer signaling or updating the system information. The updating the system information may further include: reusing system information block (SIB) updating in R8 or adopting an earthquake tsunami warning system (ETWS) in R10, etc. A minimum reconfiguration period supported by these methods for supporting reconfiguration ranges from several milliseconds to several hundred milliseconds. The method for supporting a short period uplink/downlink reconfiguration may also be applied to a long period reconfiguration, as long as the configuration does not change during several short periods.

The various specific implementations of the respective units above of the wireless communication system according to the embodiments of the present disclosure have been described in detail previously, and therefore the explanations thereof will not be repeated herein.

Apparently, respective operating processes of the method for performing a dynamic downlink configuration in a wireless communication system above according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Additionally, the present disclosure can also be implemented by connecting to a corresponding web site on the Internet through a computer, downloading and installing the computer executable program according to the invention into the computer, and then executing the program.

Figure 23:
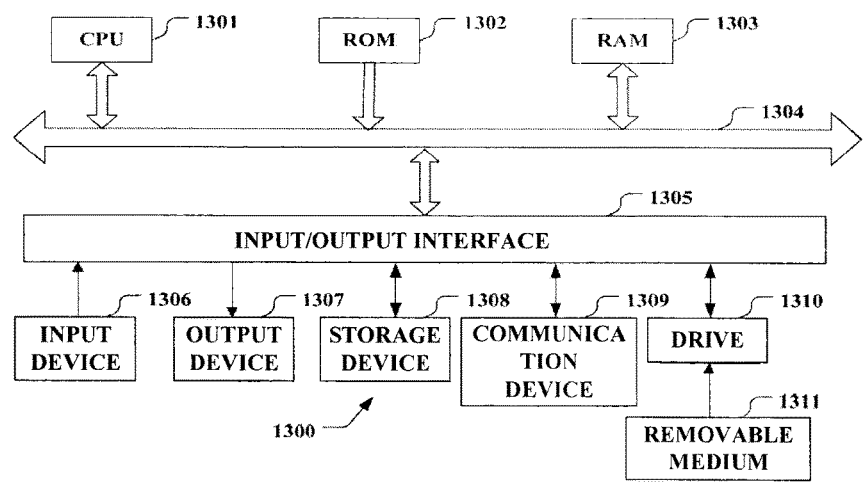
FIG. 23 is a block diagram illustrating an exemplary structure of a general-purpose personal computer on which the method for performing a dynamic downlink configuration in a wireless communication system according to the embodiments of the present disclosure can be implemented.

FIG. 23 is a block diagram illustrating an exemplary structure of a general-purpose personal computer on which the method for performing a dynamic downlink configuration in a wireless communication system according to the embodiments of the present disclosure can be implemented.

As shown in FIG. 23, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 can also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

In a case that the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 23 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiment of the present disclosure has been described in detail in combination with the drawings above, it should be understood that, the embodiment described above is only used to explain the invention and is not constructed as the limitation to the present disclosure. For those skilled in the art, various modification and alternation can be made to the above embodiment without departing from the essential and scope of the present disclosure. Therefore, the scope of the present disclosure is only defined by the appended claims and the equivalents thereof.

The invention claimed is:

1. A method for performing at a base station a dynamical downlink configuration in a wireless communication system, comprising:
    setting a reconfiguration point with a processor at the base station, so that a first uplink/downlink subframe configuration is adopted in a first configuration period before the reconfiguration point and a second uplink/downlink subframe configuration is adopted in a second configuration period after the reconfiguration point; and
    adopting, during a predetermined change of the dynamical downlink configuration, for a time sequence of a downlink HARQ process, a reference uplink/downlink subframe configuration for an uplink subframe that is an intersection of respective uplink/downlink subframe configurations,
    wherein the reference uplink/downlink subframe configuration is determined by a maximum uplink and a maximum downlink subframe intersection between the first uplink/downlink subframe configuration and the second uplink/downlink subframe configuration.

2. The method according to claim 1, wherein a boundary frame in which uplink/downlink subframe configuration is changed is included during the predetermined change of the dynamical downlink configuration.

3. The method according to claim 1, wherein the reference uplink/downlink subframe configuration includes configuration #4, configuration #2 and configuration #5.

4. The method according to claim 1, wherein a downlink HARQ process transmitted in the first configuration period which is to be retransmitted after the reconfiguration point continues to be transmitted in the second configuration period, in the case that the maximum number of the first downlink HARQ processes in the first configuration period is less than the maximum number of the second downlink HARQ processes in the second configuration period.

5. The method according to claim 1, wherein in the case that the maximum number of the first downlink HARQ processes in the first configuration period is greater than the maximum number of the second downlink HARQ processes in the second configuration period, the method further comprises:
    setting a starting point-in-time for scheduling control in the first configuration period before the reconfiguration point, to perform scheduling control on the downlink HARQ process during a time period between the starting point-in-time for scheduling control and the reconfiguration point.

6. The method according to claim 5, wherein the time period between the starting point-in-time for scheduling control and the reconfiguration point is not less than three times of a maximum RTT time.

7. The method according to claim 5, further comprising:
    scheduling, during the time period between the starting point-in-time for scheduling control and the reconfiguration point, new data to transmit the downlink HARQ process, in the case that the number of downlink HARQ processes which are to be fed back or retransmitted is less than the maximum number of the second downlink HARQ processes, wherein a sum of the number of the downlink HARQ processes which are to be fed back or retransmitted and the number of transmitted downlink HARQ processes is equal to the maximum number of the second downlink HARQ processes; and
    arranging, in the last transmission period before the reconfiguration point, process numbers of the downlink HARQ processes in an ascending order, to map the process numbers to process numbers in the second configuration period.

8. The method according to claim 7, wherein in the second configuration period, the mapped process numbers are used for informing in feeding back or retransmitting the downlink HARQ processes of the first configuration period.

9. The method according to claim 5, wherein during the time period between the starting point-in-time for scheduling control and the reconfiguration point, no new data is scheduled for transmission in the case that the number of downlink HARQ processes which are to be fed back or retransmitted is greater than or equal to the maximum number of the second downlink HARQ processes.

10. The method according to claim 9, wherein in the last transmission period before the reconfiguration point, in the case that the number of the downlink HARQ processes which are to be fed back or retransmitted is greater than the maximum number of the second downlink HARQ processes, a part of the downlink HARQ processes are discarded, such that the number of the downlink HARQ processes which are to be fed back or retransmitted becomes equal to the maximum number of the second downlink HARQ processes.

11. The method according to claim 1, wherein in the case that the maximum number of the first downlink HARQ processes in the first configuration period is greater than the maximum number of the second downlink HARQ processes in the second configuration period, the method further comprises:

mapping a process number of a downlink HARQ process which is to be fed back or retransmitted in the last transmission period before the reconfiguration point into a mapped process number, which is equal to a remainder obtained by dividing the process number by the maximum number of the second downlink HARQ processes; and using, in the second configuration period, the mapped process number for informing in feeding back or retransmitting the downlink HARQ processes of the first configuration period.

12. A non-transitory computer storage medium comprising computer readable instructions that, when executed by a computer in a base station of a wireless communication system, cause the computer to perform the method according to claim 1.

13. A device in base station of a wireless communication system, comprising a memory and a processor; wherein the memory is configured to store computer instructions; and the processor is configured to execute the computer instructions stored in the memory to perform the method according to claim 1.

14. A device included as part of base station equipment, comprising:

a processor coupled to a memory and configured to:

set a reconfiguration point with the processor in the base station equipment, such that a first uplink/downlink subframe configuration is adopted in a first configuration period before the reconfiguration point and a second uplink/downlink subframe configuration is adopted in a second configuration period after the reconfiguration point; and perform a dynamical downlink configuration, such that a reference uplink/downlink subframe configuration for an uplink subframe that is an intersection of respective uplink/downlink subframe configurations, the reference uplink/downlink subframe configuration being adopted for a time sequence of a downlink HARQ process during a predetermined change of the dynamical downlink configuration, wherein the reference uplink/downlink subframe configuration is determined by a maximum uplink and a maximum downlink subframe intersection between the first uplink/downlink subframe configuration and the second uplink/downlink subframe configuration.

15. A base station in a wireless communication system, comprising:

the device included as part of the base station equipment according to claim 14; and a transmitter configured to send a signaling to a communication terminal to inform the communication terminal of information on a dynamical downlink configuration.

16. The base station according to claim 15, wherein the transmitter is further configured to transmit or retransmit data to the communication terminal based on a dynamical downlink configuration performed by the processor of the device on the side of the base station, and the base station further comprises:

a receiver configured to receive feedback information sent from the communication terminal based on the dynamical downlink configuration.

17. The base station according to claim 15, wherein the reference uplink/downlink subframe configuration includes configuration #4, configuration #2 and configuration #5.

18. A communication terminal in a wireless communication system, comprising:

a receiver configured to receive a signaling sent from a base station to obtain information on a dynamical downlink configuration, and receive data transmitted or retransmitted by the base station based on the dynamical downlink configuration sent by a base station processor;

a processor configured to decode the data based on the dynamical downlink configuration; and a transmitter configured to send feedback information to the base station based on the dynamical downlink configuration and a decoding result of the processor, wherein a reference uplink/downlink subframe configuration for an uplink subframe that is an intersection of respective uplink/downlink subframe configurations, the reference uplink/downlink subframe configuration being adopted for a time sequence of a downlink HARQ process during the predetermined change of the dynamical downlink configuration, and the reference uplink/downlink subframe configuration is determined by a maximum uplink and a maximum downlink subframe intersection between the first uplink/downlink subframe configuration and the second uplink/downlink subframe configuration.

19. The communication terminal according to claim 18, wherein the reference uplink/downlink subframe configuration includes configuration #4, configuration #2 and configuration #5.

* * * * *